US008996571B2

(12) United States Patent
Satoh

(10) Patent No.: US 8,996,571 B2
(45) Date of Patent: Mar. 31, 2015

(54) TEXT SEARCH APPARATUS AND TEXT SEARCH METHOD

(71) Applicant: Casio Computer Co., Ltd., Tokyo (JP)

(72) Inventor: Katsuhiko Satoh, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 133 days.

(21) Appl. No.: 13/734,174

(22) Filed: Jan. 4, 2013

(65) Prior Publication Data
US 2013/0204898 A1    Aug. 8, 2013

(30) Foreign Application Priority Data

Feb. 7, 2012  (JP) ................. 2012-024491

(51) Int. Cl.
*G06F 17/30*    (2006.01)

(52) U.S. Cl.
CPC .... *G06F 17/30542* (2013.01); *G06F 17/30622* (2013.01); *G06F 17/30675* (2013.01)
USPC .......................................... 707/780; 707/741

(58) Field of Classification Search
CPC .............. G06F 17/30253; G06F 17/30613; G06F 17/30542; G06F 17/30622; G06F 17/30675
USPC ................................................ 707/780, 741
See application file for complete search history.

(56) References Cited

U.S. PATENT DOCUMENTS

| 5,992,737 | A  | * | 11/1999 | Kubota ...................... 707/999.1 |
|---|---|---|---|---|
| 6,772,150 | B1 | * | 8/2004 | Whitman et al. ............. 707/721 |
| 8,504,553 | B2 | * | 8/2013 | Vailaya et al. ................ 707/711 |
| 2003/0009490 | A1 | * | 1/2003 | Maeno .......................... 707/500 |
| 2004/0111409 | A1 | * | 6/2004 | Abe et al. .......................... 707/3 |
| 2005/0021508 | A1 | * | 1/2005 | Matsubayashi et al. .......... 707/3 |
| 2007/0027854 | A1 | * | 2/2007 | Rao et al. .......................... 707/3 |
| 2008/0005151 | A1 | * | 1/2008 | Iwakura ........................ 707/102 |
| 2008/0040330 | A1 | * | 2/2008 | Yano ................................. 707/3 |
| 2009/0150363 | A1 | * | 6/2009 | Gross et al. ....................... 707/3 |
| 2011/0047120 | A1 | * | 2/2011 | Kamvar et al. ................. 706/50 |
| 2011/0314021 | A1 | * | 12/2011 | Gibbs et al. ................... 707/737 |

FOREIGN PATENT DOCUMENTS

JP     10-049549 A     2/1998

* cited by examiner

*Primary Examiner* — Rehana Perveen
*Assistant Examiner* — Tiffany Thuy Bui
(74) *Attorney, Agent, or Firm* — Holtz, Holtz, Goodman & Chick PC

(57) ABSTRACT

The text search apparatus has an information storage that stores plural transposed indexes associating characters or character strings appearing in a document to be searched with the appearance positions of the characters or character strings. The transposed indexes were generated for a document in which beginning marks are added in front of texts to be subject to forward matching search. The incremental searcher of the text search apparatus adds a beginning mark in front of a search keyword and executes a forward matching search using a set of transposed indexes. The main searcher executes a partial match search using the same set of transposed indexes.

8 Claims, 16 Drawing Sheets

FIG. 5A

DICTIONARY DATA

| ENTRY WORD 1 | | | } CE |
|---|---|---|---|
| COMMENTARY TEXT 11 | EXAMPLE TEXT 11 | COMMENTARY TEXT 12 | } CB |
| EXAMPLE TEXT 12 | COMMENTARY TEXT 13 | EXAMPLE TEXT 13 | |
| ENTRY WORD 2 | | | } CE |
| COMMENTARY TEXT 21 | EXAMPLE TEXT 21 | COMMENTARY TEXT 22 | } CB |
| EXAMPLE TEXT 22 | COMMENTARY TEXT 23 | EXAMPLE TEXT 23 | |
| ⋮ | ⋮ | ⋮ | |

FIG. 5B

REARRANGED CONTENT TEXT DATA

| _ENTRY WORD 1 | | | } CE |
|---|---|---|---|
| COMMENTARY TEXT 11 | COMMENTARY TEXT 12 | COMMENTARY TEXT 13 | } CC |
| EXAMPLE TEXT 11 | EXAMPLE TEXT 12 | EXAMPLE TEXT 13 | } CX |
| _ENTRY WORD 2 | | | } CE |
| COMMENTARY TEXT 21 | COMMENTARY TEXT 22 | COMMENTARY TEXT 23 | } CC |
| EXAMPLE TEXT 21 | EXAMPLE TEXT 22 | EXAMPLE TEXT 23 | } CX |
| ⋮ | ⋮ | ⋮ | |

FIG. 6

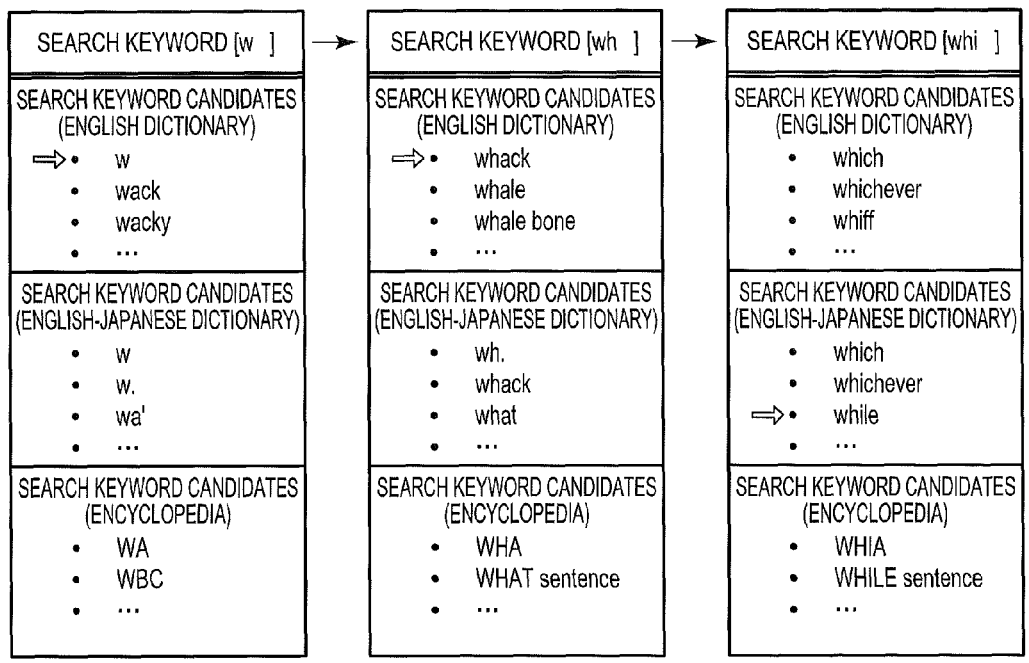

FIG. 7

SEARCH-RESULT DISPLAY SCREEN

| ENTRY SECTION | | COMMENTARY SECTION | |
|---|---|---|---|
| TEXT | DICTIONARY NAME | TEXT | DICTIONARY NAME |
| while | ENGLISH-JAPANESE DICTIONARY | [while] lag, meantime, interim, meanwhile ひとつの期間と何らかの出来事の間の時 | JAPANESE-ENGLISH DICTIONARY |
| whiles | ENGLISH-JAPANESE DICTIONARY | : | : |
| meanwhile | ENGLISH-JAPANESE DICTIONARY | | |
| while sentence | ENCYCLOPEDIA | | |

| EXAMPLE SECTION | |
|---|---|
| TEXT | DICTIONARY NAME |
| It's going to take a while to correct all the mistakes. : すべての間違いを修正するには時間がかかります。 | ENGLISH-JAPANESE DICTIONARY |
| It's been a while since we last saw each other. : この前お会いして以来、お久しぶりですね。 | ENGLISH-JAPANESE DICTIONARY |
| : | : |

FIG. 8

DICTIONARY TABLE

| DICTIONARY NUMBER | DICTIONARY NAME | START ADDRESS |
|---|---|---|
| 1 | JAPANESE DICTIONARY | 0x8000 |
| 2 | ENGLISH-JAPANESE DICTIONARY | 0x8800 |
| 3 | JAPANESE-ENGLISH DICTIONARY | 0x9000 |
| 4 | ENCYCLOPEDIA | 0x9800 |
| ⋮ | ⋮ | ⋮ |

FIG. 13

DETERMINING METHOD TABLE

| NUMBER OF SEARCH KEYWORDS | SPECIFIED CATEGORY | ORDER DETERMINING METHOD |
|---|---|---|
| SINGLE | ENTRY SECTION | EXPRESSION 2 |
| SINGLE | COMMENTARY SECTION | EXPRESSION 3 |
| SINGLE | EXAMPLE SECTION | EXPRESSION 4 |
| PLURAL | ENTRY SECTION | EXPRESSION 5 |
| PLURAL | COMMENTARY SECTION | EXPRESSION 6 |
| PLURAL | EXAMPLE SECTION | EXPRESSION 7 |
| ⋮ | ⋮ | ⋮ |

IN THE CASE OF $Pos_{stdstr} \leq Pos_{vfystr_1}$

IN THE CASE OF $Pos_{stdstr} > Pos_{vfystr_1}$

TEXT SEARCH APPARATUS AND TEXT SEARCH METHOD

CROSS-REFERENCE TO RELATED APPLICATION

This application claims the benefit of Japanese Patent Application No. 2012-024491, filed on Feb. 7, 2012, the entire disclosure of which is incorporated by reference herein.

FIELD

The present invention relates to a text search apparatus and a text search method.

BACKGROUND

Apparatuses searching documents (e.g., dictionaries) containing plural items (fields) are known. To enhance the convenience for users, some search apparatuses not only determine whether a character string exists in documents to be searched, but also determine the order of the documents arranged in search results on the basis of, for example, the appearance frequencies of the character string (e.g., Unexamined Japanese Patent Application Kokai Publication No. H10-049549 (Patent Literature 1)). In the technique disclosed in Patent Literature 1, an index is used for searching.

Some electronic dictionaries have two search functions to enhance the convenience for users: an incremental search function to retrieve entry words every time one character of a search keyword is input and to display a list of retrieved entry words; and a full text search (main search) function to search the entire text after completion of input of a search keyword. Such electronic dictionaries generally execute the incremental search through forward matching search and execute the full text search through partial match search.

However, to allow a single apparatus to perform the function using forward matching search and the function using partial match search by applying the technique of Patent Literature 1, the apparatus is required to separately store different pieces of index information corresponding to the individual functions. This causes a problem of increase in necessary storage capacity.

The present invention has been achieved in view of such background. An object of the present invention is to provide a text search apparatus and a text search method that can achieve search functions with great convenience for users and that require only a small storage capacity.

SUMMARY

To achieve the above-mentioned object, the text search apparatus according to one aspect of the present invention has:

a storage that stores index information associating each of characters or character strings contained in a document to be searched including plural categories with each of appearance positions of the characters or the character strings in the document;

an acquirer that acquires a search keyword;

a forward matching searcher that executes a forward matching search using the index information to retrieve a character or a character string beginning with the search keyword from characters or character strings that belong to a category to be subject to the forward matching search in the document;

a partial match searcher that executes a partial match search using the index information to retrieve a character or a character string containing the search keyword from the document; and an outputter that outputs a result of the search by the forward matching searcher and a result of the search by the partial match searcher.

The present invention can provide a text search apparatus and a text search method that can achieve search functions with great convenience for users and that require only a small storage capacity.

BRIEF DESCRIPTION OF THE DRAWINGS

A more complete understanding of this application can be obtained when the following detailed description is considered in conjunction with the following drawings, in which:

FIG. 5A is a diagram showing an example of dictionary data stored in the text search apparatus;

FIG. 5B is a diagram showing an example of rearranged content text data stored in the text search apparatus;

FIG. 6 is a diagram showing an example of a search-result display screen of an incremental search displayed by the text search apparatus according to Embodiment 1;

FIG. 7 is a diagram showing an example of a search-result display screen of a main search displayed by the text search apparatus according to Embodiment 1;

FIG. 8 is a diagram showing an example of a dictionary table stored in the text search apparatus according to Embodiment 1;

FIG. 13 is a diagram showing an example of a determining method table stored in the text search apparatus according to Embodiment 1;

DETAILED DESCRIPTION

A text search apparatus 100 according to an embodiment of the present invention is described below with reference to the attached drawings.

Figure 1:
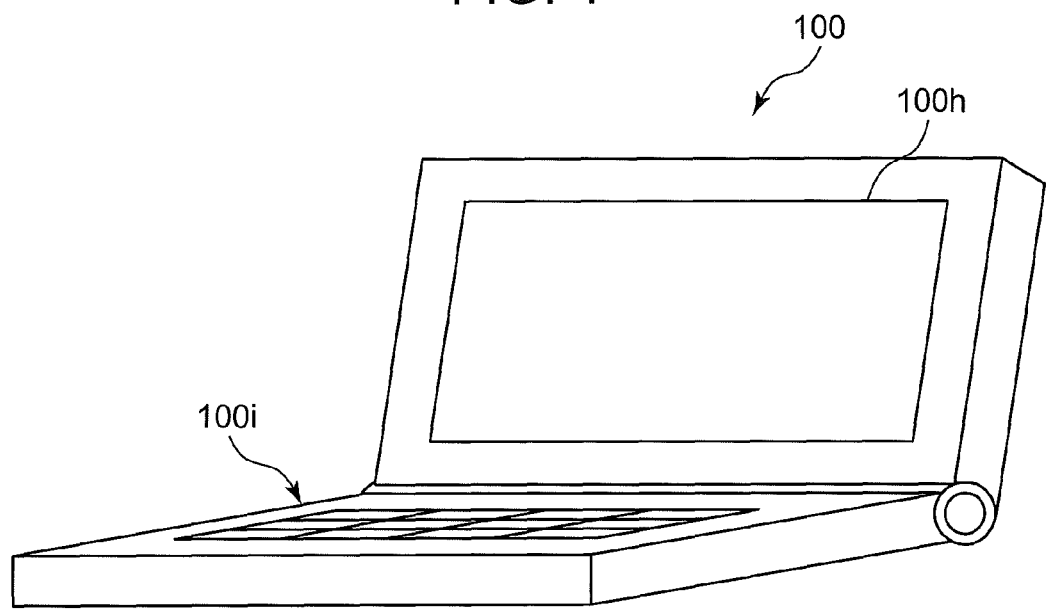
FIG. 1 is a perspective view showing an example of a text search apparatus according to Embodiment 1 of the present invention.

The text search apparatus 100 according to the embodiment of the present invention is configured as an electronic dictionary as shown in FIG. 1. The text search apparatus 100 has a keyboard 100i through which a search keyword is input in response to a user's operation, and an LCD (Liquid Crystal Display) 100h that displays results of searching dictionaries based on the search keyword.

Figure 2:
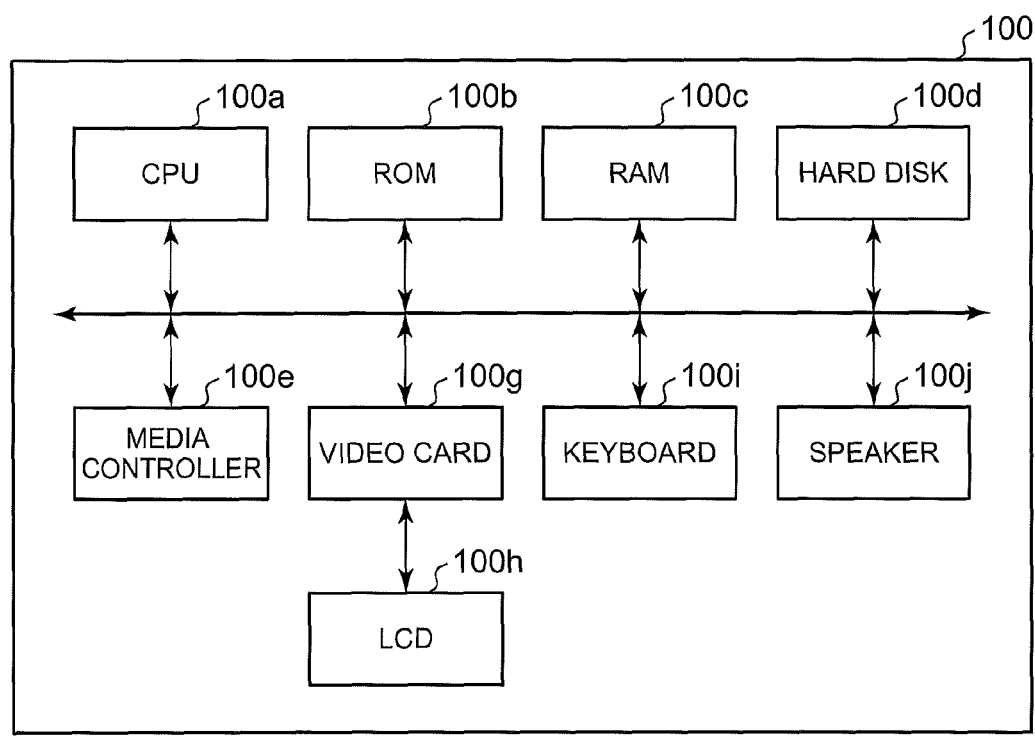
FIG. 2 is a hardware configuration diagram showing a configuration example of the text search apparatus according to Embodiment 1.

Inside the text search apparatus 100, a CPU (Central Processing Unit) 100a, a ROM (Read Only Memory) 100b, a RAM (Random Access Memory) 100c, a hard disk 100d, a media controller 100e, a video card 100g, and a speaker 100j, as shown in FIG. 2, are provided, and are connected via a bus with the LCD 100h and the keyboard 100i shown in FIG. 1.

The CPU 100a is caused by a program stored in the ROM 100b or the hard disk 100d to control each component of the text search apparatus 100 and to execute internal processes for the below-described search processes. While the CPU 100a is executing the program, the RAM 100c is used as a work area, for example, for temporarily storing data to be processed.

The hard disk 100d stores tables containing various data, and dictionary data such as data indicating an English-Japanese dictionary. The text search apparatus 100 may have a flash memory in place of the hard disk 100d.

The media controller 100e reads various data and programs from recording media including flash memories, CDs (Compact Discs), DVDs (Digital Versatile Discs), and Blu-ray Discs (registered trademark).

The video card 100g renders an image based on a digital signal output from the CPU 100a, and outputs an image signal indicating the rendered image. The LCD 100h displays an image in accordance with the image signal output from the video card 100g. The text search apparatus 100 may have a PDP (Plasma Display Panel) or an EL (Electroluminescence) display in place of the LCD 100h. The speaker 100j outputs sound based on a signal output from the CPU 100a.

Figure 3:
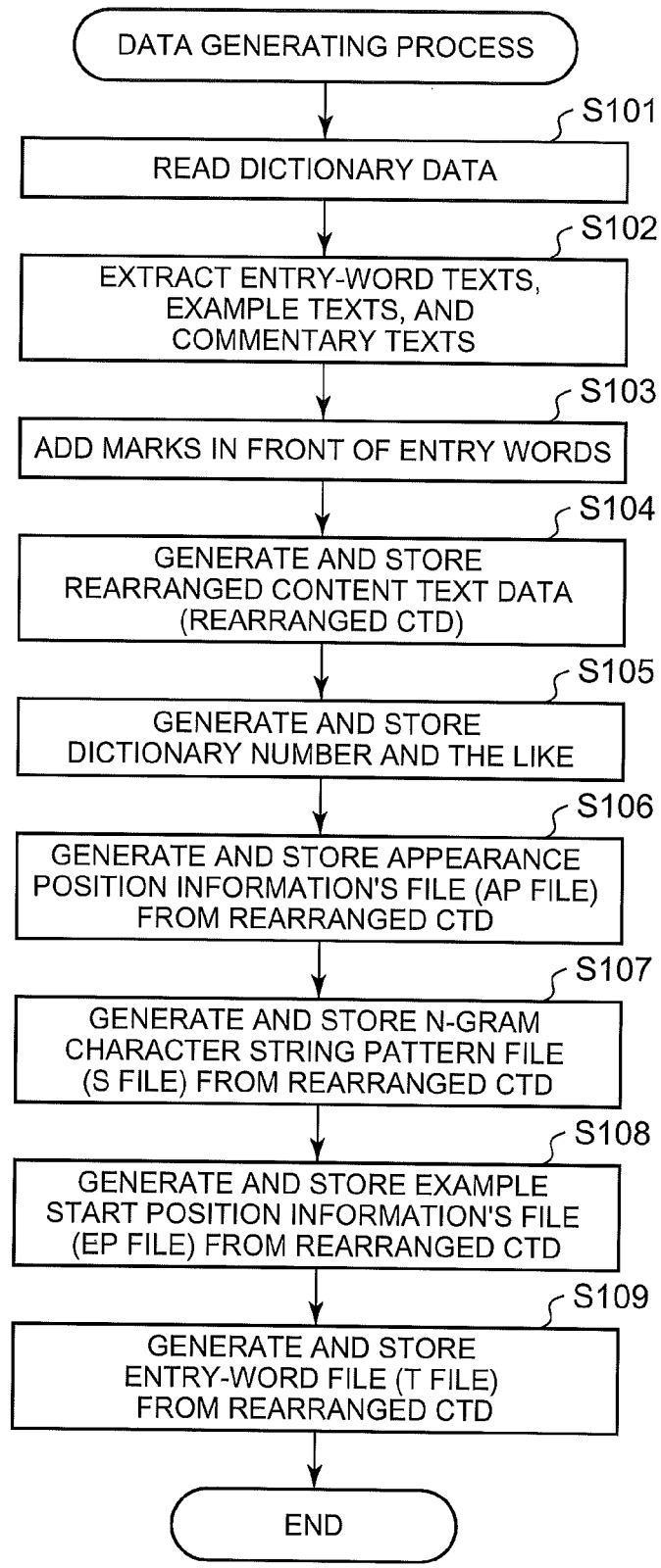
FIG. 3 is a flowchart showing an example of a data generating process executed by the text search apparatus according to Embodiment 1.
Figure 4:
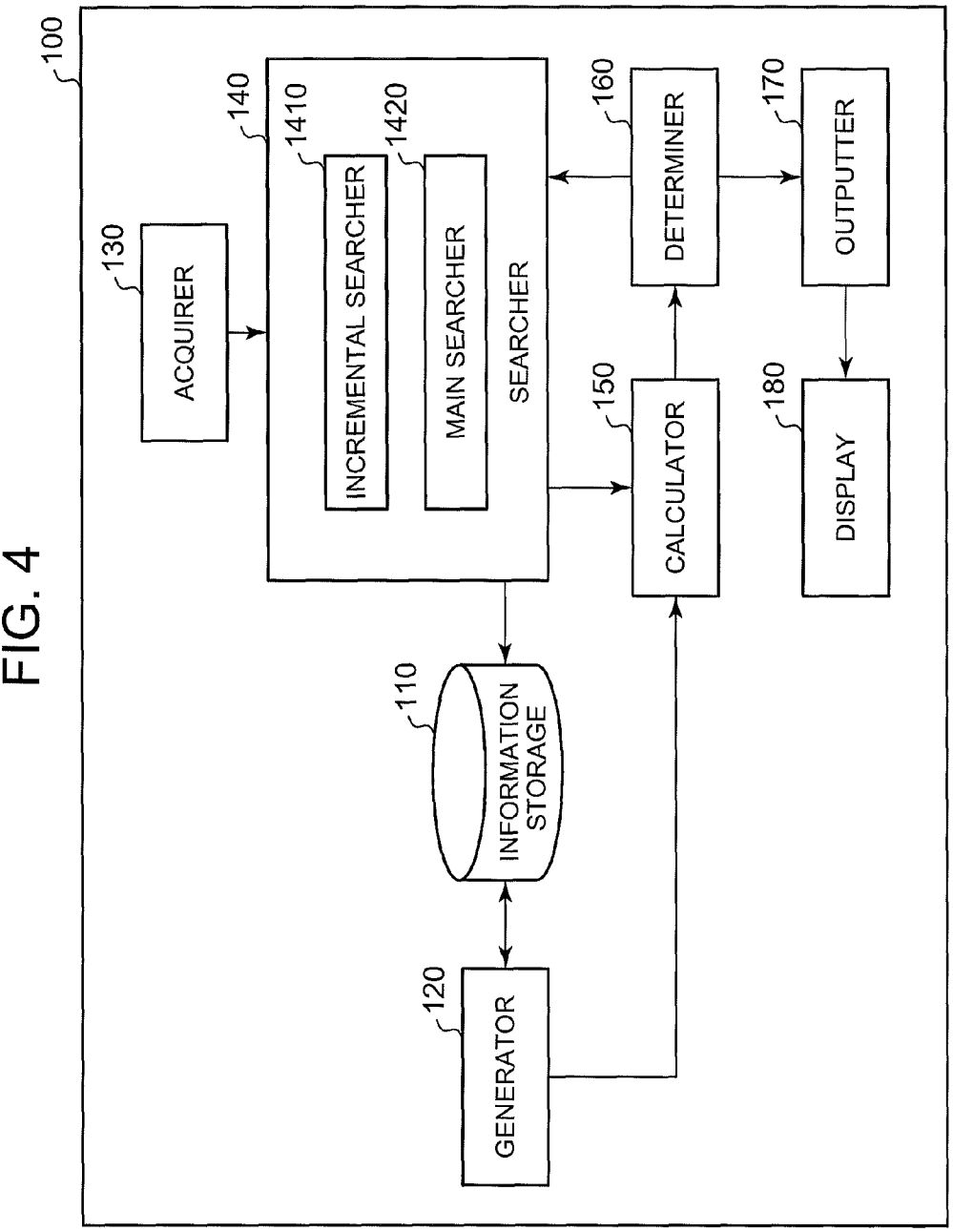
FIG. 4 is a functional block diagram showing an example of functions of the text search apparatus according to Embodiment 1.

When a user inserts a recording medium storing dictionary data into the media controller 100e shown in FIG. 2, the CPU 100a receives a signal indicating dictionary data from the media controller 100e. After thus acquiring the dictionary data from the media controller 100e, the CPU 100a stores the dictionary data in the hard disk 100d. The CPU 100a thereafter executes a data generating process as shown in FIG. 3, for generating data and electronic files for use in searching a dictionary indicated by the dictionary data based on a search keyword. The CPU 100a thus cooperates with other components of the text search apparatus 100 to function as a generator 120 as shown in FIG. 4. FIG. 4 is a functional block diagram illustrating functions executed by the CPU 100a. The CPU 100a cooperates with other components of the text search apparatus 100, in particular, the hard disk 100d, to function as an information storage 110.

The information storage 110 stores dictionary data to be searched in the present embodiment. The dictionary data is formed of, as shown in FIG. 5A, texts representing entry words (hereinafter individually referred to as "entry-word text"), texts providing commentaries on the entry words (hereinafter individually referred to as "commentary text"), and texts providing usage examples for the entry words (hereinafter individually referred to as "example text") such as set phrases or compound words (hereinafter referred to as "phrases"). The commentary text and the example text are collectively called "body text". In other words, the texts contained in the dictionary data are classified into two categories (entry-word-text category and body-text category), i.e., texts representing entry words (entry-word texts), and texts for explaining the entry words (body texts). The texts that belong to the body-text category are further classified into two categories (commentary-text category and example-text category), i.e., commentaries on the entry words and usage examples for the entry words.

In the dictionary data, a section occupied by an entry-word text is called "entry section CE", and a section occupied by a body text is called "body-text section CB".

A commentary text is located between a pair of commentary tags indicating that the content of the text is a commentary. An example text is located between a pair of example tags indicating that the content of the text is a usage example.

The dictionary data is formed of a series of constituent units, each of which is a set of an entry section CE and a body-text section CB. The constituent units are arranged in alphabetical order of entry-word texts located in the entry sections CE. In each constituent unit, immediately after an entry section CE containing an entry-word text, a body-text section CB containing a body text for explaining the entry word is located.

To each entry section CE, an entry-word number identifying the entry section CE is assigned in advance. The dictionary data contains plural pieces of information each associating information indicating the entry-word number, information indicating the start address of a storage area within the information storage 110 that stores an entry section CE identified by the entry-word number, and information indicating the start address of a body-text section CB stored immediately after the entry section CE. The number of the plural pieces of information is equivalent to the number of the entry words.

In a body-text section CB, commentary texts are arranged in an order determined by an editor of the electronic dictionary. For a specific example, a commentary text describing a more general meaning of an entry word is stored at a position before a commentary text describing a more specialized meaning of the entry word. A commentary text describing a more-frequently-used meaning may be stored at a position before a commentary text describing a less-frequently-used meaning.

The text search apparatus 100 according to the present embodiment searches the dictionary data stored in the information storage 110 for a search keyword in the below-described two ways, and presents results of the searches to the user.

First, every time the user inputs one character of a search keyword using the keyboard 100i, the text search apparatus 100 executes a forward matching search for the currently-input keyword and displays entry words at the beginning of which the search keyword is located. This search process is called "incremental search". A mode in which the text search apparatus 100 is executing an incremental search is called "incremental search mode". FIG. 6 shows an example of execution of an incremental search.

When the user inputs the first character ("w" in the example in FIG. 6) of a search keyword, the text search apparatus 100 retrieves entry words beginning with the character "w" from plural pieces of dictionary data (an English dictionary, an English-Japanese dictionary, and an encyclopedia in this example). The text search apparatus 100 then presents a list of the retrieved entry words in such a manner that the user can select one, as shown in the left part of FIG. 6.

When the user inputs the subsequent character ("h" in this example), the text search apparatus 100 retrieves and displays entry words beginning with the character string "wh" (the middle part of FIG. 6). When the user inputs three or more characters, the text search apparatus 100 also retrieves and displays entry words in the same manner (e.g., the right part of FIG. 6). After a desired entry word ("while" in this example) is displayed as a candidate, the user can at any time select the desired entry word so that the body text thereof is displayed.

FIG. 6 shows an example in which results of incremental search are displayed separately for each dictionary data (the English dictionary, the English-Japanese dictionary, and the encyclopedia). However, an embodiment is not limited to this example, and may be modified so that all the search results may be sorted in the order of the characters and displayed in one place. In this case, only one of the duplicate words may be displayed.

Second, when the user performs a finalizing operation after inputting a search keyword using the keyboard 100*i*, the text search apparatus 100 according to the present embodiment executes a partial match search to retrieve entry-word texts, commentary texts, and example texts containing the search keyword and displays search results (FIG. 7). This search process is called "main search". A mode in which the text search apparatus 100 is executing a main search is called "main search mode".

In the present embodiment, an incremental search and a main search are executed using a single set of index information (transposed indexes).

A data generating process, which is a preparatory process for both incremental search and main search using a single set of indexes (transposed indexes), is described below with reference to FIG. 3. The generator 120, when acquiring dictionary data, starts the data generating process shown in FIG. 3.

In the data generating process, the generator 120 reads dictionary data indicating dictionary content stored in the information storage 110 (step S101).

Then, the generator 120 extracts entry-word texts and body texts (commentary texts and example texts) from the read dictionary data (step S102). The extraction process is specifically described below. Since body-text sections CB contain commentary texts and example texts in a mixed manner, the generator 120 classifies the texts according to the content thereof. For the classification, the generator 120 extracts plural entry-word texts and body texts from the dictionary data using information indicating entry-word numbers, information indicating the start addresses of entry sections CE, and information indicating the start addresses of body-text sections CB, which are contained in the dictionary data.

In addition, for each of the extracted entry-word texts, the generator 120 extracts from the body texts plural commentary texts describing the entry word represented by the entry-word text based on commentary tags, and extracts from the body texts plural example texts providing usage examples for the entry word based on example tags, at the step S102.

The generator 120 adds, in front of each text that belongs to a category to be subject to incremental search (entry-word text in this example), a mark indicating the beginning of the text ("beginning mark", a space in this example) (step S103).

The generator 120 thereafter generates and stores rearranged content text data (CTD) as shown in FIG. 5B (step S104). Specifically, the generator 120 adds beginning marks (the symbol "_" is used in place of a space in this example) to the entry-word texts, and then arranges the extracted commentary texts, without changing the order, in one place for each constituent unit, to thereby generate a section where the extracted commentary texts are located (hereinafter referred to as "commentary section CC").

In the same manner, the generator 120 arranges the extracted example texts, without changing the order, in one place for each constituent unit, to thereby generate a section where the extracted example texts are located (hereinafter referred to as "example section CX").

The generator 120 thus generates plural pieces of data (rearranged content text data, or rearranged CTD) each associating an entry section CE, a commentary section CC, and an example section CX. Then, the generator 120 stores the generated rearranged content text data in the information storage 110 (step S104).

The generator 120 thereafter generates a dictionary number identifying a dictionary expressed as each rearranged content text data. Next, the generator 120 stores, in the information storage 110, plural pieces of information each associating information indicating the generated dictionary number, information indicating the dictionary name, and information indicating the start address of a storage area within the information storage 110 that stores the rearranged content text data (step S105).

The generator 120 thereafter extracts, for each of the texts indicated by the rearranged content text data (i.e., texts located in an entry section CE, a commentary section CC, and an example section CX), a unigram character string pattern by cutting out one character from the text while shifting target characters one character by one character from the beginning of the text. In the same way, the generator 120 extracts a bigram character string pattern by cutting out two characters from each text indicated by the rearranged content text data while shifting target characters one character by one character from the beginning of the text. Hereinafter, character string patterns extracted by cutting out the predetermined number (hereinafter referred to as "N") of characters from a text indicated by rearranged content text data while shifting target characters one character by one character from the beginning of the text, such as a unigram character string pattern and a bigram character string pattern, are collectively called "N-gram character string pattern". In the present embodiment, a character string is regarded to encompass a character, and a character and a character string are not distinguished unless otherwise stated.

Then, the generator 120 specifies, for each N-gram character string pattern, one or more positions (hereinafter individually referred to as "appearance position") at which the N-gram character string pattern appears in the texts indicated by the rearranged content text data (hereinafter referred to as "rearranged texts"). The generator 120 thereafter calculates, for each N-gram character string pattern, an appearance frequency of the N-gram character string pattern in the rearranged texts. The appearance frequency is explained below as the total number of times that an N-gram character string pattern appears in the rearranged texts, for example, but is not limited thereto.

Next, the generator 120 generates, for each N-gram character string pattern, appearance position information associating one or more pieces of information indicating addresses (hereinafter referred to as "appearance position addresses") designating appearance positions at which the N-gram character string pattern appears with information indicating an appearance frequency of the N-gram character string pattern.

The generator 120 thereafter generates an electronic file (hereinafter referred to as "appearance position information's file" or "AP file"), which contains one or more pieces of appearance position information. The generator 120 then stores the appearance position information's file in the information storage 110 (step S106 in FIG. 3).

Figure 9:
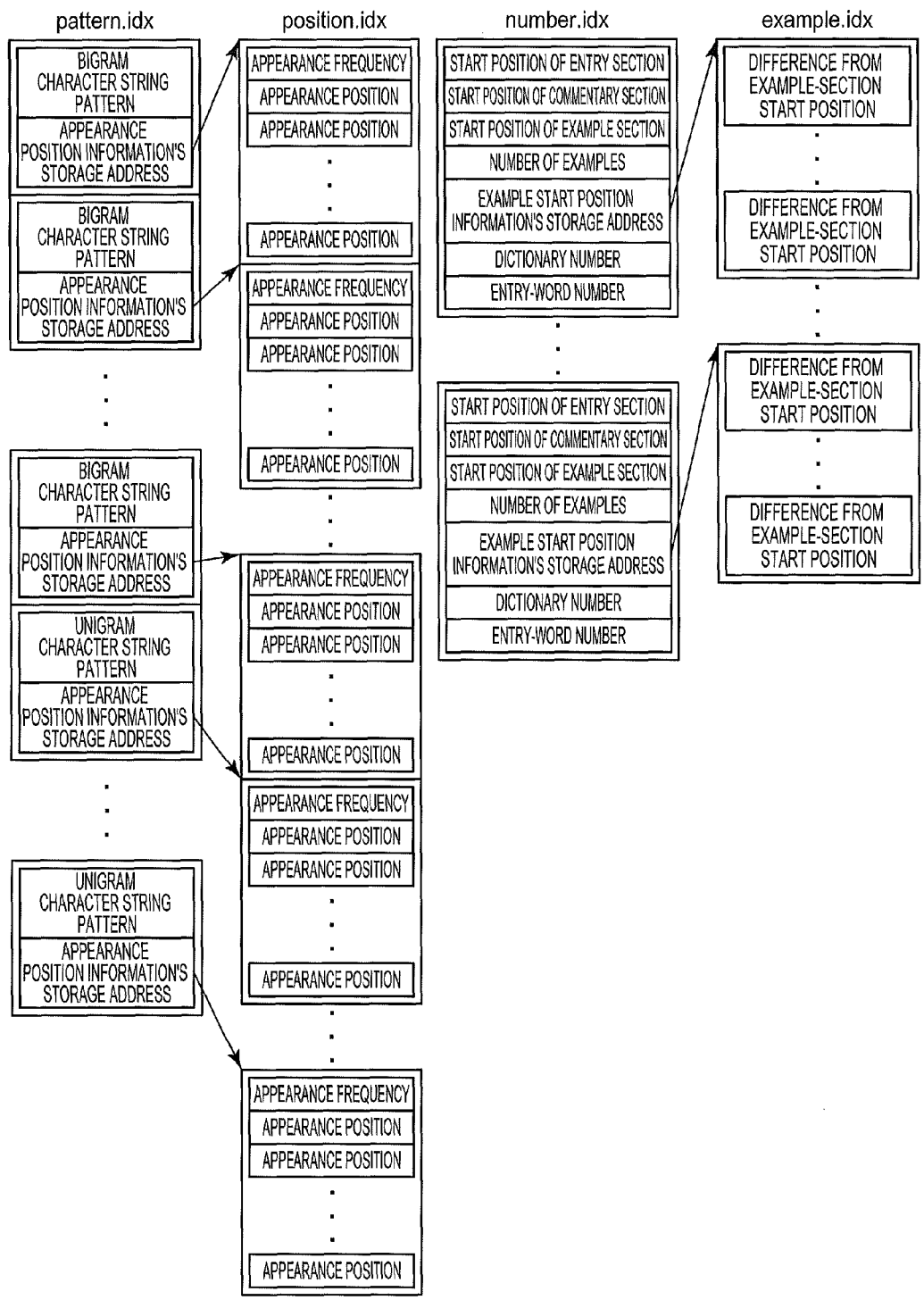
FIG. 9 is a diagram showing an example of electronic files containing transposed indexes and stored in the text search apparatus according to Embodiment 1.

In FIG. 9, the appearance position information's file (AP file) is shown with the name (file name) "position.idx". In the appearance position information contained in the appearance position information's file, information indicating an appearance frequency is stored in an area within a predetermined number of bytes from the start address for storing the appearance frequency, and each of one or more pieces of information indicating appearance position addresses is stored in subsequent areas within every predetermined number of bytes for storing appearance positions.

Then, the generator 120 generates an electronic file (hereinafter referred to as "N-gram character string pattern file" or "S file"), which contains plural pieces of information each associating information indicating an N-gram character string pattern (hereinafter referred to as "N-gram character string pattern information") with information indicating the start address (hereinafter referred to as "appearance position information's storage address") of a storage area within the information storage 110 that stores appearance position information of the N-gram character string pattern. The generator 120 thereafter stores the S file in the information storage 110 (step S107).

In FIG. 9, the S file is shown with the name (file name) "pattern.idx".

Next, the generator 120 calculates, for each entry word, a difference (hereinafter referred to as "difference from the example-section start position") between the start address of an example section CX containing example texts providing usage examples for the entry word and the start address of each example text. The number of differences to be calculated is equivalent to the number of the example texts located in the example section CX (hereinafter referred to as "the number of examples"). The generator 120 thereafter generates, for each entry word, example start position information formed of information indicating one or more differences from the example-section start position. The generator 120 then generates an electronic file (hereinafter referred to as "example start position information's file" or "EP file"), which contains the generated plural pieces of example start position information.

In FIG. 9, the EP file is shown with the name (file name) "example.idx".

Then, the generator 120 stores the example start position information's file in the information storage 110 (step S108 in FIG. 3). In the example start position information contained in the EP file, information indicating a difference from the example-section start position is stored in an area within a predetermined number of bytes from the start address for storing the difference, and each piece of information indicating other differences is stored in subsequent areas within every predetermined number of bytes.

Next, the generator 120 generates an electronic file (hereinafter referred to as "entry-word file" or "T file"), which contains plural pieces of information each associating information indicating an entry-word number identifying an entry section CE containing an entry-word text, information indicating the start address (hereinafter referred to as "address designating the start position of an entry section CE") of a storage area within the information storage 110 that stores the entry section CE, information indicating the start address (hereinafter referred to as "address designating the start position of a commentary section CC") of a commentary section CC in which commentary texts describing an entry word represented by the entry-word text are located, information indicating the start address (hereinafter referred to as "address designating the start position of an example section CX") of an example section CX in which example texts providing usage examples for the entry word are located, information indicating the number of examples in the example section CX, information indicating an address (hereinafter referred to as "example start position information's storage address") designating the start position of a storage area within the information storage 110 that stores example start position information (EP file, "example.idx" in FIG. 9) for the example section CX, and information indicating a dictionary number identifying a dictionary containing the entry word.

In FIG. 9, the T file is shown with the name (file name) "number.idx".

The generator 120 stores the T file in the information storage 110 (step S109 in FIG. 3), and then terminates the execution of the data generating process.

Index structures in which a character string (in this example, an N-gram character string pattern) and the appearance positions thereof in a document to be searched for the character string are associated with each other and stored, as shown in FIG. 9 (in particular, "pattern.idx" and "position.idx"), are called "transposed indexes". In the present embodiment, the data generating process generates transposed indexes of rearranged CTD in which beginning marks are added in front of texts that belong to a category to be subject to incremental search.

After having stored the transposed indexes in the information storage 110, the text search apparatus 100 becomes ready to execute a search process using the transposed indexes. In this state, when the user inputs using the keyboard 100i a search keyword for use in searching dictionaries, the CPU 100a receives this information and executes the text search process shown in FIG. 10.

Through execution of the text search process, the CPU 100a functions as an acquirer 130, a searcher 140 including an incremental searcher 1410 and a main searcher 1420, a calculator 150, a determiner 160, and an outputter 170, as shown in FIG. 4. Also, the CPU 100a functions as a display 180 by cooperating with the video card 100g and the LCD 100h shown in FIG. 2.

Figure 10:
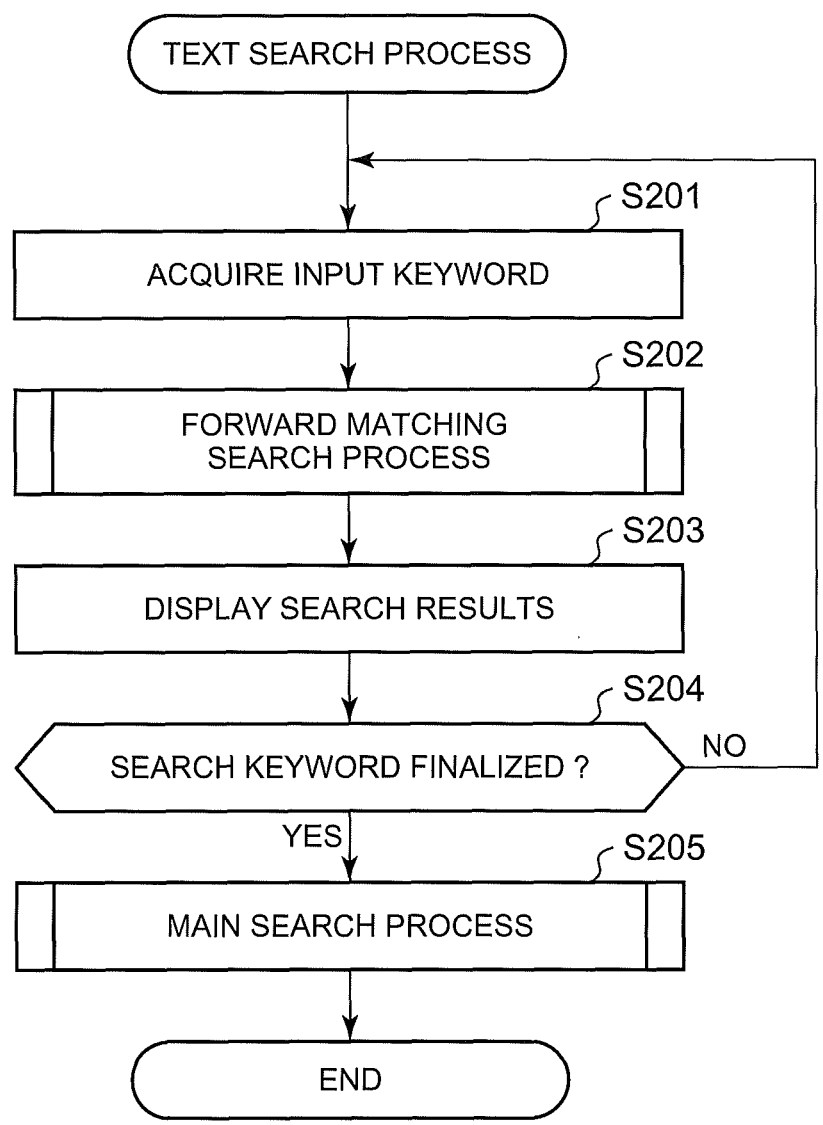
FIG. 10 is a flowchart showing an example of a text search process executed by the text search apparatus according to Embodiment 1.

When the user starts inputting a search keyword using the keyboard 100i, the text search apparatus 100 shifts from a standby mode to an incremental search mode, and the CPU 100a starts the text search process shown in FIG. 10. In the text search process, the acquirer 130 acquires a keyword that has been input (input keyword) (step S201).

The incremental searcher 1410 then executes a forward matching search process of retrieving entry words containing the input keyword through forward matching search using the above-described transposed indexes (step S202).

The forward matching search process executed at the step S202 is described below with reference to FIG. 11. In the forward matching search process, a beginning mark (a space in this example) is added in front of the acquired input keyword (step S301). For example, when the input keyword acquired at the step S201 is "whi", a character string "_whi" formed by adding a space (represented by the symbol "_") in front of "whi" is set as an input keyword to be used in the process below. The following describes this example.

Then, the searcher 140 (incremental searcher 1410) generates N-gram character string patterns from the acquired search keyword, and sets the generated N-gram character string patterns as search patterns (step S302).

The value N varies depending on a set value (value N corresponding to a set of transposed indexes) and the number of characters in the input keyword. For example, when the input keyword is "_whi" and the set value N is 2, the incremental searcher 1410 generates as search patterns the bigram character string patterns "_w", "wh", and "hi". When the set value N is 3, the incremental searcher 1410 generates the patterns "_wh" and "whi". When the number of characters in an input keyword (after the addition of a beginning mark) is equal to or smaller than the set value (e.g., when the set value N is 3 and the input keyword is "_w"), the incremental searcher 1410 sets the number of characters in the input keyword (2 in this case) as the value N. Then, the incremental searcher 1410 generates just one N-gram character string pattern (bigram "_w" in this case). The following assumes that the set value N is 2 and the patterns "_w", "wh", and "hi" are generated.

Then, the incremental searcher 1410 determines whether the search pattern generated at the step S302 is a single search pattern (step S303).

When determining that plural search patterns were generated (step S303; No), the incremental searcher 1410 specifies the appearance positions of each search pattern and specifies a notable appearance position among the appearance positions (step S304).

In this case, an appearance position of a search pattern with the lowest appearance frequency among the generated search patterns is determined as a notable appearance position. Specifically, the incremental searcher 1410 acquires the appearance frequency of each search pattern from the AP file (i.e., appearance position information's file) and the S file (i.e., N-gram character string pattern file). That is, the incremental searcher 1410 retrieves information indicating appearance position information's storage address associated with information indicating each generated search pattern from the N-gram character string pattern file ("pattern.idx" in FIG. 9). Then, using the position designated by the appearance position information's storage address indicated by the retrieved information, the incremental searcher 1410 acquires appearance position information stored in the information storage 110 from the appearance position information's file ("position.idx" in FIG. 9). Next, the incremental searcher 1410 extracts information indicating an appearance frequency stored in an area within the predetermined number of bytes from the start address of the acquired appearance position information for storing the appearance frequency.

The incremental searcher 1410 thereafter specifies, among the generated search patterns, a search pattern associated with the lowest appearance frequency as a notable search pattern. The following assumes the pattern "wh" to be the notable search pattern. Using a search pattern with the lowest appearance frequency to search a dictionary for a search keyword can reduce the number of execution of the below-described loop (loop from the steps S304 to S316 in FIG. 11), to thereby enable faster execution of the incremental search process.

Further, at the step S304, the incremental searcher 1410 reads the predetermined number of bytes for storing the appearance position in an area subsequent to the area storing information indicating the appearance frequency in the appearance position information for the notable search pattern, and selects the first appearance position of the notable search pattern as the notable appearance position (step S304).

Then, the incremental searcher 1410 specifies appearance positions (specified appearance positions) of the search patterns other than the notable search pattern (other search patterns) (step S305).

Specifically, the incremental searcher 1410 acquires information indicating a predetermined area that the information storage 110 stores in advance. Further, the incremental searcher 1410 specifies, among the appearance positions of "_w" and "hi", which are the search patterns other than the notable search pattern "wh", appearance positions that exist within the predetermined area from the notable appearance position, as the specified appearance positions (step S305).

Next, the incremental searcher 1410 evaluates the continuity of the notable appearance position and the specified appearance positions of the other search patterns (step S306), determines the presence of continuity (step S307), and determines whether the input keyword exists in a portion including the notable appearance position.

Specifically, the incremental searcher 1410 acquires, with respect to the notable search pattern and the other search patterns, the relative positions (distance and anteroposterior relationship) in the input keyword at the step S306. For example, within the input keyword (after addition of a beginning mark) "_whi", the notable search pattern "wh" is located one character after another search pattern "_w" and is located one character before the other search pattern "hi". The relative position means such positional information as "being located n character(s) before/after".

In the same way, the incremental searcher 1410 compares the specified appearance positions with the notable appearance position specified with reference to the S file and the AP file at the step S304, and acquires the relative positions between the other search patterns and the notable search pattern in the rearranged content text data. If all the relative positions between the other search patterns and the notable search pattern in the input keyword agree with those in the rearranged content text data, the incremental searcher 1410 evaluates that the appearance positions have continuity. In contrast, the relative position between any of the other search patterns and the notable search pattern in the input keyword disagrees with that in the rearranged content text data, the incremental searcher 1410 evaluates that the appearance positions lack continuity. The incremental searcher 1410 thus evaluates the continuity for the notable appearance position (step S306).

The incremental searcher 1410 determines whether the appearance positions were evaluated at the step S306 to have continuity (step S307). When determining that the appearance positions were evaluated to lack continuity (step S307; No), the incremental searcher 1410 does not determine the notable appearance position as a search hit portion, and terminates the process. The incremental searcher 1410 thereafter determines whether the above-described process has been executed for all the appearance positions of the notable search pattern (step S308).

When determining that the above-described process has not been executed for all the appearance positions of the notable search pattern (step S308; No), the incremental searcher 1410 returns to the step S304, selects the subsequent appearance position, and repeats the above-described process.

When determining that the above-described process has been executed for all the appearance positions (step S308; Yes), the incremental searcher 1410 jumps to the step S318.

When determining at the step S307 that the appearance positions were evaluated to have continuity (step S307; Yes), the incremental searcher 1410 determines, with respect to the currently-selected notable appearance position, the specified appearance position of the leading search pattern ("_w" in this example) among all the search patterns generated at the step S302, as the appearance position (search hit portion) of the input keyword ("_whi" in this example) in the rearranged texts (step S309).

When determining at the step S303 that a single search pattern was generated (step S303; Yes), the incremental searcher 1410 sets the single search pattern as the notable search pattern and acquires appearance positions thereof in the same way as the step S304, and selects an unprocessed appearance position among the acquired appearance positions as the notable appearance position (step S310). Then, the incremental searcher 1410 specifies the notable appearance position as the appearance position of the input keyword in the rearranged texts (step S311).

After specifying the appearance position of the input keyword at the step S309 or S311, the incremental searcher 1410 refers to the T file ("number.idx" in FIG. 9) and the example start position information's file (EP file, "example.idx" in FIG. 9), and specifies in which section (any one of an entry section CE, a commentary section CC, and an example section CX) in which constituent unit the appearance position exists (step S312).

Specifically, the incremental searcher 1410 specifies the entry section CE an address designating the start position of which is the largest one of addresses designating start positions located before the appearance position specified for the input keyword ("_whi" in this example). The entry section CE thus specified is called "specified entry section". In other words, the specified entry section is an entry section CE of a constituent unit in which the appearance position is located.

Next, the incremental searcher 1410 refers to the T file (entry-word file, "number.idx" in FIG. 9), and acquires information indicating an address designating the start position of the specified entry section, information indicating an address designating the start position of the commentary section CC (hereinafter referred to as "commentary section CC corresponding to the specified entry section") that contains commentary texts describing the entry word represented by the entry-word text contained in the specified entry section, information indicating an address designating the start position of the example section CX corresponding to the specified entry section, information indicating the example start position information's storage address corresponding to the specified entry section, information indicating the dictionary number identifying each dictionary containing the entry word, and information indicating the entry-word number identifying the specified entry section. On the basis of the information, the incremental searcher 1410 generates an identifier (entry-word number) for the specified entry section and information for specifying the position of each section. A constituent unit containing the specified entry section is called "specified constituent unit". According to the position of each section, the incremental searcher 1410 can determine in which section of the specified constituent unit the appearance position specified for the input keyword is located. This section is called "specified section".

Further, at the step S312, when the specified section is an entry section CE, the calculator 150 calculates an evaluation value $\text{Est}_{idxid,cgy}$ for the appearance position using Expression (1) below:

$$\text{Est}_{idxid,cgy} = \text{Est}_{idxid,0} = \text{Pos}_{stdstr,0} - \text{PosSt}_{idxid,headline,hdlid} \quad (1)$$

where idxid is the acquired entry-word number, cgy is the identifier for the specified section. As cgy, 0 is assigned to an entry section CE, 1 is assigned to a commentary section CC, and 2 is assigned to an example section CX. In this case, since an evaluation value is not calculated unless the specified section is an entry section CE, cgy takes only 0. $\text{Pos}_{stdstr,0}$ represents the appearance position specified for the input keyword, and $\text{PosSt}_{idxid,headline,hdlid}$ represents the start position of the entry section CE having the entry-word number idxid. In other words, the evaluation value $\text{Est}_{idxid,cgy}$ indicates how many characters the appearance position specified for the input keyword is away from the beginning of the entry word. The evaluation value $\text{Est}_{idxid,cgy}$ may not take 0 when the entry word contains a beginning mark (space).

Then, the determiner 160 determines whether the appearance position specified for the input keyword is located at the beginning of the entry section CE (step S313). That is, when the specified section is an entry section CE and the evaluation value is 0 (step S313; Yes), the appearance position specified for the input keyword is located at the beginning of the entry section CE, and therefore the entry section CE is determined as a search hit portion in the forward matching search. The determiner 160 therefore reflects the entry section CE in search results (step S314). When the specified section is not an entry section CE or the evaluation value is not 0 (step S313; No), the appearance position specified for the input keyword is excluded from search results (step S315) and is not subject to the below-described process.

The incremental searcher 1410 thereafter determines whether the above-described process has been executed for all the appearance positions of the notable search pattern acquired at the step S304 as the notable appearance position (step S316). When any appearance position remains unprocessed (step S316; No), the incremental searcher 1410 repeats the process for the subsequent appearance position. In this case, the incremental searcher 1410 determines whether the generated search pattern is a single search pattern at the step S303 (step S317). The incremental searcher 1410 returns to the step S304 when plural search patterns were generated (step S317; No), and returns to the step S310 when a single search pattern was generated (step S317; Yes).

When the above-described process has been executed for all the appearance positions (step S316; Yes), the incremental searcher 1410 sorts the entry sections CE reflected in the search results at the step S314 in the order of the entry-word number (step S318). This process is executed for each dictionary data stored in the dictionary table shown in FIG. 8.

Referring back to FIG. 10, after retrieving the entry word through forward matching search at the step S202, the outputter 170 outputs information indicating the search results to the display 180 so that the display 180 displays the search results as shown in FIG. 6 (step S203).

Then, the text search apparatus 100 determines whether the search keyword has been finalized (step S204). Specifically, if detecting an operation of finalizing the currently-input keyword as the search keyword (e.g., pressing down of an enter key), the text search apparatus 100 sets the currently-input keyword as the search keyword. When not detecting the finalizing operation (step S204; No), the text search apparatus 100 waits for a new operation of inputting an additional character. When receiving a new operation and acquiring a new input keyword, the text search apparatus 100 repeats for the keyword the process from the step S201.

When detecting the above-mentioned finalizing operation to finalize the search keyword (step S204; Yes), the text search apparatus 100 shifts to a main search mode and executes a main search process based on the search keyword (step S205).

In the main search process, the text search apparatus 100 executes a partial match search (full text search) in the entire texts contained in the rearranged content text data, and displays search hit portions in the order of the priority (refer to FIG. 7). The example in FIG. 7 shows that the search results are displayed in accordance with the priority in each category.

This process may be executed by any known method for searching the entire texts in documents to be searched and displaying results of partial match search in accordance with the priority. In this example, the main search is executed thorough the below-described process. The text search apparatus 100 is not necessarily required to search the entire texts, and may be modified, for example, so that the user can select the scope of the documents to be searched (e.g., types of dictionaries, categories, or sections).

The main search process executed at the step S205 is described below with reference to FIG. 12.

Figure 12:
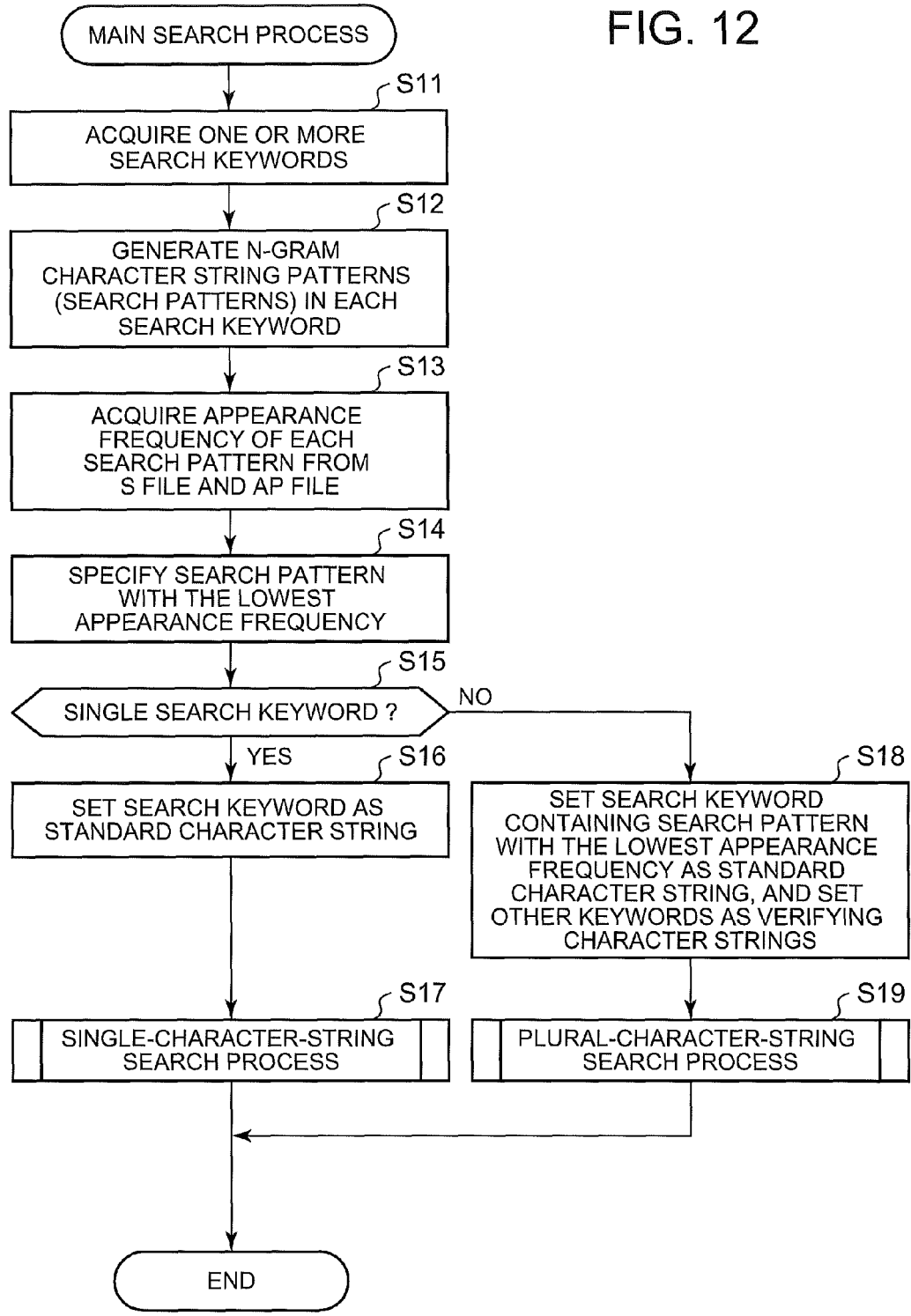
FIG. 12 is a flowchart showing an example of a main search process executed by the text search apparatus according to Embodiment 1.

In the text search process shown in FIG. 12, the acquirer 130 acquires the finalized search keyword (one or more search keywords) (step S11). When the finalized search keyword contains any delimiters (e.g., spaces), the acquirer 130 acquires plural search keywords formed by dividing the input keyword with the delimiters. The following describes an example where the acquirer 130 acquires a single search keyword "while".

Figure 11:
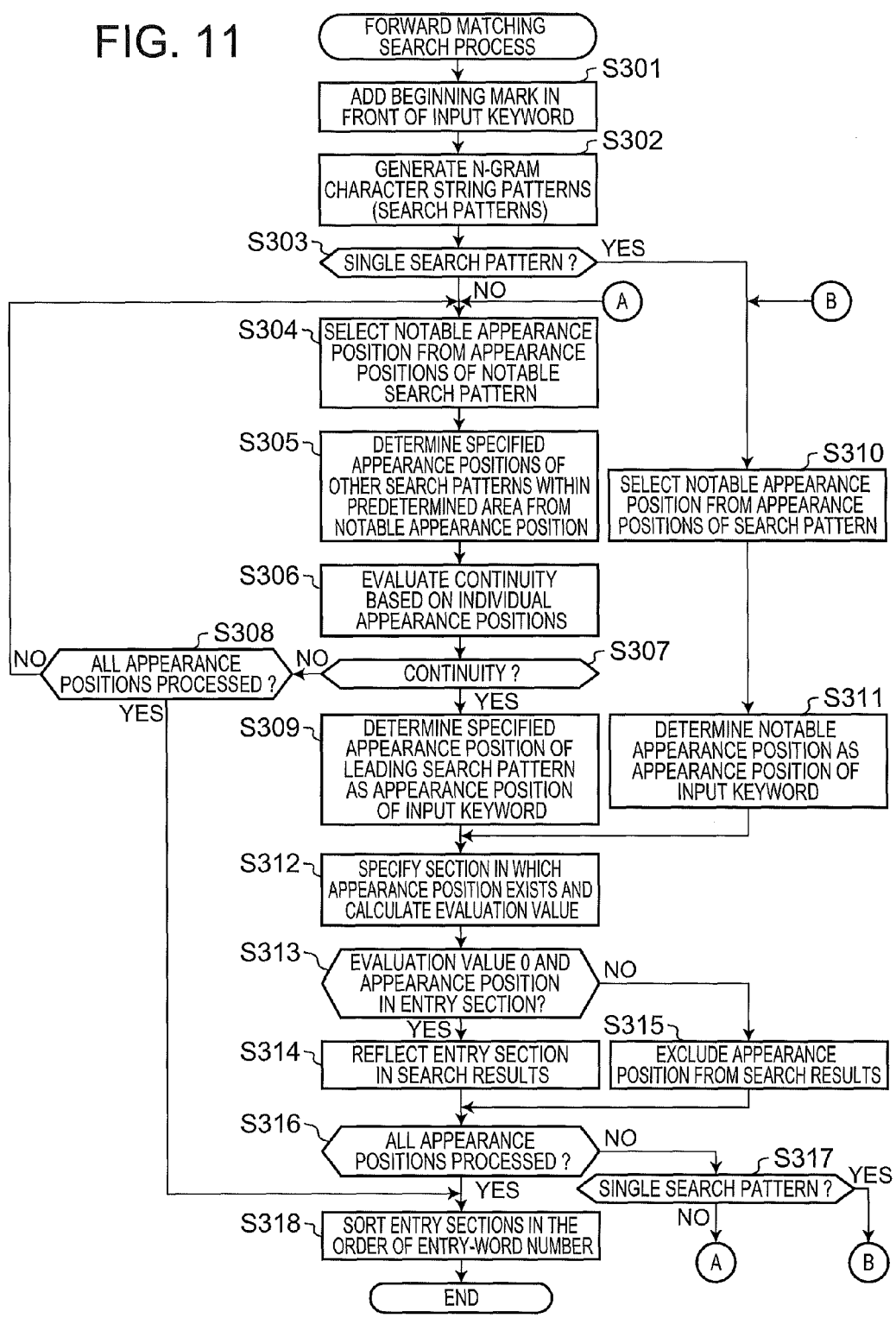
FIG. 11 is a flowchart showing an example of a forward matching search process executed by the text search apparatus according to Embodiment 1.

After the step S11, the main searcher 1420, in the same manner as the step S302 in FIG. 11, generates from the acquired search keyword ("while" in this example) N-gram character string patterns ("wh", "hi", "il", and "le"), and sets the generated N-gram character string patterns as search patterns (step S12). When plural search keywords were acquired, the main searcher 1420 generates N-gram character string patterns for each keyword.

Then, the main searcher 1420, in the manner described for the step S304 in FIG. 11, acquires an appearance frequency of each search pattern (step S13). The main searcher 1420 thereafter specifies a search pattern with the lowest appearance frequency (step S14), since a text search process of searching a dictionary for a search keyword based on such a search pattern with the lowest appearance frequency requires less time than that based on another search pattern with a higher appearance frequency. The following assumes that the search pattern "il" has the lowest appearance frequency.

Next, the main searcher 1420 determines whether the search keyword acquired at the step S11 is a single keyword (step S15). When determining that a single search keyword was acquired (step S15; Yes), the main searcher 1420 sets the search keyword as a standard character string (search keyword used as a standard upon determination of the priority) (step S16). Then, the main searcher 1420 executes a single-character-string search process (step S17).

When determining that plural keywords were acquired (step S15; No), the main searcher 1420 sets as a standard character string a search keyword containing a search pattern with the lowest appearance frequency among the search patterns generated at the step S12, and sets the search keywords other than the standard character string as verifying character strings (step S18). This step reduces the calculation amount required for the search. The main searcher 1420 thereafter executes a process of searching for plural search keywords (plural-character-string search process) (step S19). After the search process at the step S17 or S19, the main searcher 1420 terminates the main search process shown in FIG. 12.

Figure 14:
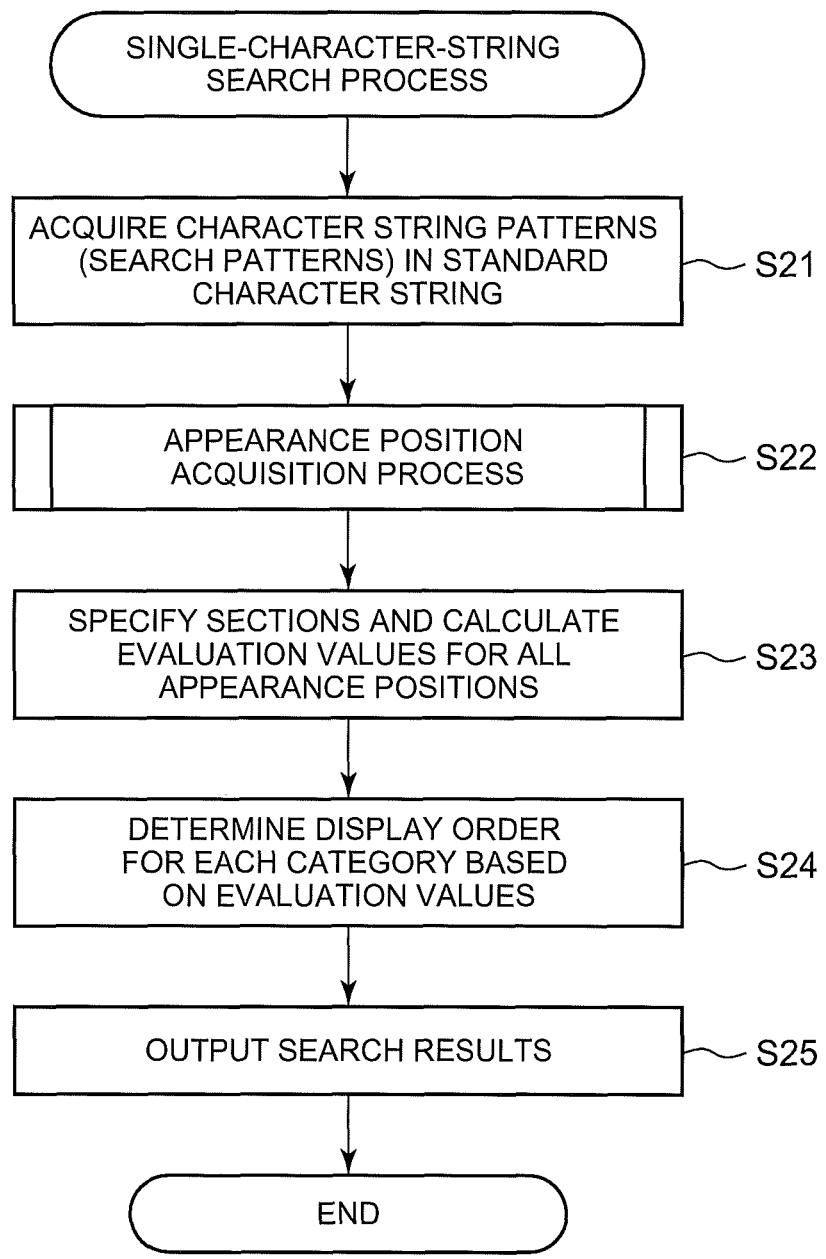
FIG. 14 is a flowchart showing an example of a single-character-string search process executed by the text search apparatus according to Embodiment 1.

The single-character-string search process executed at the step S17 is described below with reference to FIG. 14. In the single-character-string search process, the main searcher 1420 acquires, as search patterns, the N-gram character string patterns in the standard character string that were generated at the step S12 in FIG. 12 (step S21).

Then, the main searcher 1420 executes a process of acquiring all the appearance positions of the standard character string in the rearranged CTD (appearance position acquisition process) (step S22).

Figure 15:
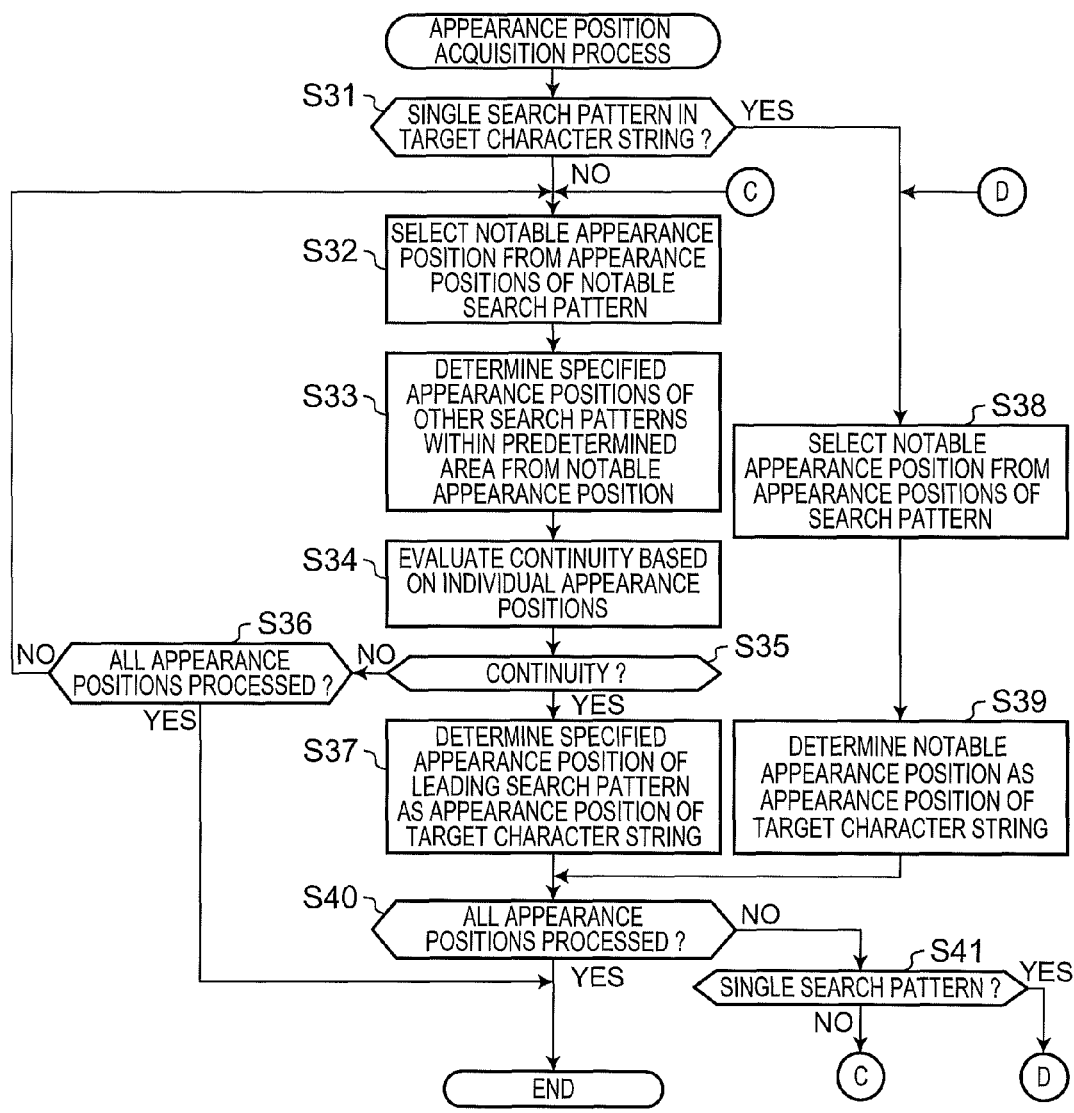
FIG. 15 is a flowchart showing an example of an appearance position acquisition process executed by the text search apparatus according to Embodiment 1.

The appearance position acquisition process is described below with reference to FIG. 15. The main searcher 1420 determines whether the generated search pattern is a single pattern for a character string of which the appearance positions should be acquired ("subject character string", standard character string in this example) (step S31). When determining that plural search patterns were generated (step S31; No), the main searcher 1420 executes the steps S32 to S35 in the same manner as the steps S304 to S307 in FIG. 11. That is, the main searcher 1420 acquires the appearance positions of a notable search pattern and selects a notable appearance position (step S32), acquires the appearance positions of the other search patterns (specified appearance positions) (step S33), evaluates the continuity for the appearance positions (step S34), and determines whether the appearance positions are continuously aligned (step S35).

When determining that the notable appearance position and the specified appearance positions lack continuity at the step S35 (step S35; No), the main searcher 1420 proceeds to the step S36 and determines whether all the appearance positions have been processed (step S36). When determining that any appearance position remains unprocessed (step S36; No), the main searcher 1420 repeats the process from the step S32 for the subsequent appearance position. When determining that all the appearance positions have been processed (step S36; Yes), the main searcher 1420 terminates the appearance position acquisition process.

When determining that the notable appearance position and the specified appearance positions have continuity (step S35; Yes), the main searcher 1420 determines, in the same manner as the step S309 in FIG. 11, the specified appearance position of the leading search pattern among all the search patterns in the subject character string as the appearance position of the subject character string in the rearranged texts (step S37).

When determining at the step S31 that a single search pattern was generated (step S31; Yes), in the same manner as the step S32, the main searcher 1420 sets the single search pattern as the notable search pattern, and acquires the appearance positions and selects a notable appearance position (step S38). The main searcher 1420 thereafter specifies the notable appearance position as the appearance position of the subject character string in the rearranged texts (step S39).

Next, the main searcher 1420 determines whether the above-described process has been executed for all the appearance positions of the notable search pattern as the notable appearance position (step S40). When determining that any appearance position remains unprocessed (step S40; No), the main searcher 1420 repeats the process for the subsequent appearance position. Then, the main searcher 1420 determines whether the search pattern was determined at the step S31 to be a single search pattern (step S41). The main searcher 1420 returns to the step S38 in the case of a single search pattern (step S41; Yes), and returns to the step S32 in the case of plural search patterns (step S41; No).

When determining that the above-described process has been executed for all the appearance positions (step S40; Yes), the main searcher 1420 has specified all the appearance positions of the subject character string, and therefore terminates the appearance position acquisition process.

Referring back to FIG. 14, after acquiring all the appearance positions of the standard character string in the rearranged CTD at the step S22, the main searcher 1420 specifies in which section (any one of an entry section CE, a commentary section CC, and an example section CX) in which constituent unit each of the appearance positions is located (step S23). The concrete specification method is the same as that at the step S312 in FIG. 11.

Further, at the step S23, the calculator 150 refers to the determining method table shown in FIG. 13, and acquires a method of determining an evaluation value (order determining method) corresponding to a current search condition and each appearance position.

For example, when the number of search keywords is "single" (i.e., a single search keyword was acquired) and the specified section for the search keyword is an entry section CE, the calculator 150 acquires information indicating the calculation method for an evaluation value using Expression (2). In this case, the text contained in the entry section CE is called "specified text".

In addition, after acquiring information indicating a calculation method for an evaluation value, the calculator 150 calculates an evaluation value for each appearance position using the method indicated by the information (step S23). The lower the evaluation value, the higher the output priority.

In the present embodiment, when a single search keyword was acquired and the specified section is an entry section CE, an evaluation value $Est_{idxid,0}$ is calculated using Expression (2) below:

$$Est_{idxid,0} = \frac{NumStr_{index}}{NumStr_{stdstr}} \quad (2)$$

where $NumStr_{index}$ represents the length of a character string in a specified section (entry section), and $NumStr_{stdstr}$ represents the length of a standard character string.

The evaluation value calculated by Expression (2) takes the minimum value when the standard character string completely agrees with the character string in the specified section (entry section) (i.e., entry-word text), and takes a greater value, as the entry-word text in the specified entry section contains more characters other than the standard character string "while". This is due to the fact that a user usually desires display of an entry-word text that completely agrees with a standard character string, which is a search keyword, and a user usually prefers display of an entry-word text containing fewer characters other than a search keyword as opposed to display of an entry-word text containing more characters other than the search keyword.

When a single search keyword was acquired and the specified section is a commentary section CC, an evaluation value $Est_{idxid,1}$ is calculated using Expression (3) below:

$$Est_{idxid,1} = Pos_{stdstr} - PosSt_{idxid,comentary} \quad (3)$$

where $PosSt_{idxid,comentary}$ is the start position of a commentary section CC corresponding to a specified entry section idxid. The evaluation value calculated by Expression (3) takes a lower value, as the specified appearance position of the standard character string is located closer to the start position of the commentary section CC. For example, when plural commentary texts each containing the standard character string are located in the same commentary section CC, a commentary text stored at an earlier position in the commentary section CC has a lower evaluation value. With respect to commentary texts located in a commentary section CC in the rearranged content text data, for example, a commentary text describing a more general meaning of an entry word or a more-frequently-used meaning of the entry word is stored at an earlier position. This is due to the fact that a user usually prefers display of a text providing a general commentary or a commentary on a frequently-used meaning, that is, a commentary text stored at an earlier position in a commentary section CC is considered more likely to be the text that the user desires. In this case, a character string having a predetermined number of characters and containing a search hit portion among the commentary text containing the search hit portion in the commentary section CC is called "specified text".

When a single search keyword was acquired and the specified section is an example section CX, an evaluation value $Est_{idxid,2}$ is calculated using Expression (4) below:

$$Est_{idxid,2} = Pos_{stdstr} - PosSt_{idxid,example,expid} \quad (4)$$

where $PosSt_{idxid,example,expid}$ represents the start position of an example text (whose example number is expid) containing a standard character string in an example section CX corresponding to a specified entry section idxid.

The searcher 140 acquires $PosSt_{idxid,example,expid}$ according to the steps below:

The searcher 140 refers to and acquires example start position information from the EP file (i.e., example start position information's file) named "example.idx" shown in FIG. 9, based on the example start position information's storage address acquired at the step S23. The searcher 140 further acquires, from among information indicating differences from the example-section start position contained in the example start position information, a difference that is the greatest one of the differences smaller than the difference between the calculated start position of the example section CX and the specified appearance position to be processed.

The searcher 140 thereafter specifies the ordinal number of the information indicating the acquired difference in the example start position information based on the predetermined number of bytes for storing the difference, and sets the specified ordinal number as an example number.

Then, the searcher 140 calculates the start position $PosSt_{idxid,example,expid}$ of the example text having the specified example number by adding the acquired difference to the start position of the example section CX corresponding to the specified entry section.

The evaluation value calculated by Expression (4) takes a lower value, as the specified appearance position of the standard character string is located closer to the start position of the example text. For example, when plural example texts each containing the standard character string are located in the same example section CX, regardless of storage position in the example section CX, an example text in which the standard character string "while" appears at an earlier position than that in another example text has a lower evaluation value. This is due to the fact that regarding the standard character string "while", which is a search keyword, a text providing a more general usage example or a more-frequently-used example usually contains the standard character string "while" at an earlier position than that in another example text, for example, and a user usually desires display of a text providing a general usage example or a frequently-used example, that is, an example text containing the standard character string "while" at an earlier position is considered more likely to be the text that the user desires. In this case, a character string having a predetermined length and containing a search hit portion in the example text is called "specified text". That is, the specified text is a text that contains a search hit portion and that should be displayed as search results. An embodiment is not limited to the above example, and may be modified so that the specified text may be extracted from texts including search results based on arbitrarily-set setting information.

After the evaluation values for all the appearance positions have been calculated at the step S23, the determiner 160 determines the display order of one or more specified texts based on the calculated evaluation values for the specified texts in each category of the specified texts (step S24). In the present embodiment, the determiner 160 determines the display order so that a specified text with a lower evaluation value is displayed at an earlier position.

The outputter 170 thereafter outputs to the display 180 a signal indicating a search-result display screen as shown in FIG. 7, which displays one or more specified texts in the determined display order for each category (step S25). Then, the single-character-string search process is terminated. The display 180 displays a search-result display screen based on the output signal.

Figure 16:
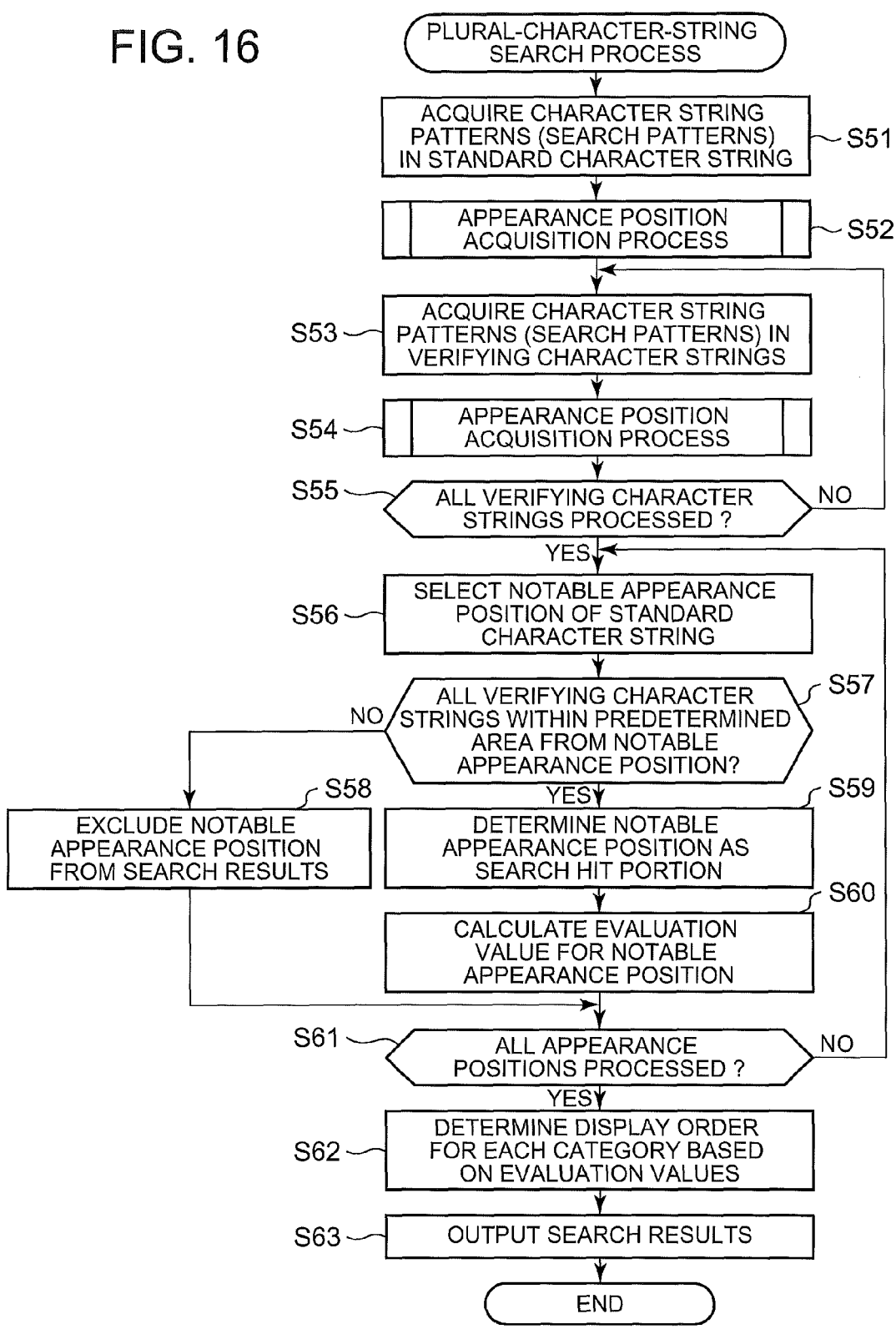
FIG. 16 is a flowchart showing an example of a plural-character-string search process executed by the text search apparatus according to Embodiment 1.

The plural-character-string search process executed at the step S19 is described below with reference to FIG. 16.

In the plural-character-string search process, the main searcher 1420 acquires the N-gram character string patterns in the standard character string that were generated at the step S12 in FIG. 12 (step S51).

Then, the main searcher 1420 executes a process of acquiring all the appearance positions of the standard character string in the rearranged CTD (appearance position acquisition process, FIG. 15) (step S52).

The main searcher 1420 further acquires N-gram character string patterns in one of the verifying character strings set at the step S18 in FIG. 12 (step S53).

The main searcher 1420 thereafter executes a process of acquiring all the appearance positions of a verifying character string in the rearranged CTD (appearance position acquisition process, FIG. 15) (step S54).

After having acquired all the appearance positions of a certain verifying character string, the main searcher 1420 determines whether all the verifying character strings have been processed (step S55). When determining that any verifying character string remains unprocessed (step S55; No), the main searcher 1420 repeats the process from the step S53 for the subsequent verifying character string.

When determining that the appearance positions of all the verifying character strings have been acquired (step S55; Yes), the main searcher 1420 selects one of the appearance positions of the standard character string acquired at the step S52 as the notable appearance position (step S56).

Then, the main searcher 1420 determines, based on the appearance positions of the verifying character strings acquired at the step S54, whether all the verifying character strings appear within the predetermined area from the notable appearance position (step S57). When the notable appearance position is located in an entry section CE with a certain entry-word number, the predetermined area means the entire entry section CE. When the notable appearance position is located in a commentary section CC, the predetermined area means the area of a predetermined number of characters in the entire commentary section CC. When the notable appearance position is located in an example section CX, the predetermined area means the area occupied by the example text (each of the example texts such as example text 11 and example text 12 in FIG. 5B) containing the notable appearance position.

The "predetermined area" is not limited to the above examples, and may be arbitrarily set, or may be changed through a user's operation or the like.

When determining that not all the verifying character strings appear within the predetermined area from the notable appearance position (step S57; No), the main searcher 1420 determines that the notable appearance position is not a search hit portion in the search (AND search) for the plural search keywords, and therefore excludes the notable appearance position from search results (step S58).

When determining that all the verifying character strings appear within the predetermined area from the notable appearance position (step S57; Yes), the main searcher 1420 determines the notable appearance position as a search hit portion (step S59). The main searcher 1420 thereafter calculates an evaluation value for the notable appearance position (step S60).

The following describes the calculation method for an evaluation value in this process. The calculator 150 refers to the determining method table shown in FIG. 13, and acquires an order determining method (calculation method) corresponding to a category of a section containing the notable appearance position, and corresponding to the number of search keywords.

When the notable appearance position is located in an entry section CE, the calculator 150 acquires, from the determining method table shown in FIG. 13, information indicating the order determining method "Expression (5)", which is associated with information indicating that the number of search keywords is "plural" and information indicating the specified category "entry section".

Next, the calculator 150 acquires the number of characters in the standard character string and each verifying character string. The calculator 150 thereafter calculates an evaluation value for the specified text containing the notable appearance position by applying each value to Expression (5) below:

$$Est_{idxid,cgy}=Est_{idxid,0}=EstDist_{WithoutOrder} \quad (5)$$

$$EstDist_{WithoutOrder}=EstDist=\max Pos-\min Pos$$

where maxPos: upper limit of an area including all search keywords when all of $Dist_{stdstr,vfystr_k}$ minimum value;

minPos: lower limit of an area including all search keywords when all of $Dist_{stdstr,vfystr_k}$ takes the minimum value;

$$Dist_{stdstr,vfystr_k} = \begin{cases} (Pos_{vfystr_k} + NumStr_{vfystr_k}) - Pos_{stdstr}[Pos_{stdstr} \leq Pos_{vfystr_k}] \\ (Pos_{stdstr} + NumStr_{stdstr}) - Pos_{vfystr_k}[Pos_{stdstr} > Pos_{vfystr_k}] \end{cases}$$

Est-Dist: distance between search keywords;

$EstDist_{WithoutOrder}$: distance between search keywords (without consideration of the input order);

$Dist_{stdstr,vfystr_k}$: distance between a standard character string and the kth verifying character string;

NumStr$_{vfystr_k}$: the number of characters in the kth verifying character string;

NumStr$_{stdstr}$: the number of characters in the standard character string;

Pos$_{vfystr_k}$: specified appearance position of the kth verifying character string; and Pos$_{stdstr}$: specified appearance position of the standard character string.

Figure 17A:
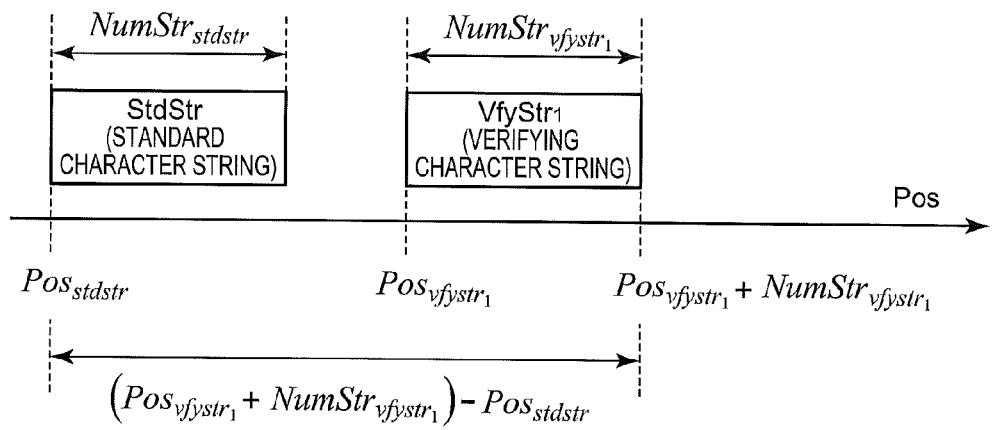
FIG. 17A is a diagram showing an example of a distance between a verifying character string and a standard character string when the specified appearance position of the standard character string is located before the specified appearance position of the verifying character string.
Figure 17B:
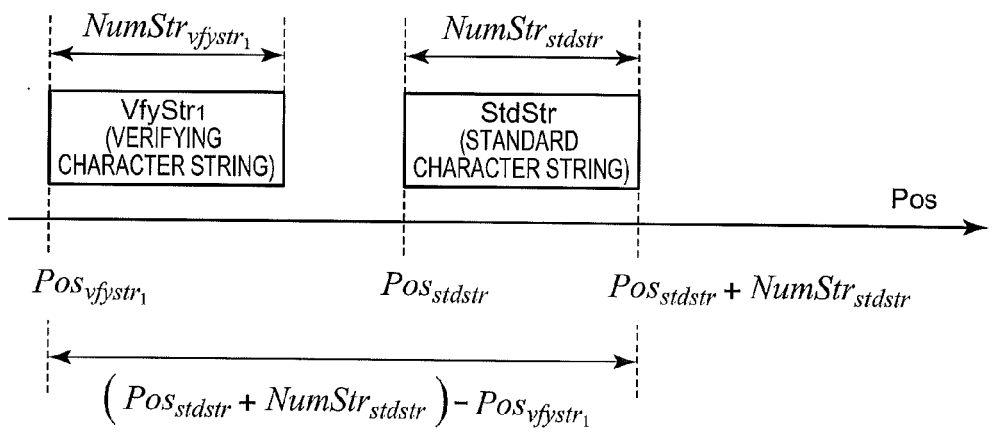
FIG. 17B is a diagram showing an example of a distance between a verifying character string and a standard character string when the specified appearance position of the standard character string is located after the specified appearance position of the verifying character string.

The following describes, regarding a distance between the standard character string and the kth verifying character string calculated by Expression (5), an example in which the standard character string is "while" and the first verifying character string is "for". As shown in FIG. 17A, when the specified appearance position of the standard character string "while" is located before the specified appearance position of the first verifying character string "for", the distance between the standard character string "while" and the first verifying character string "for" means a distance from the beginning of the standard character string "while" to the end of the first verifying character string "for". In contrast, as shown in FIG. 17B, when the specified appearance position of the standard character string "while" is located after the specified appearance position of the first verifying character string "for", the distance between the standard character string "while" and the first verifying character string "for" means a distance from the beginning of the first verifying character string "for" to the end of the standard character string "while".

Figure 18:
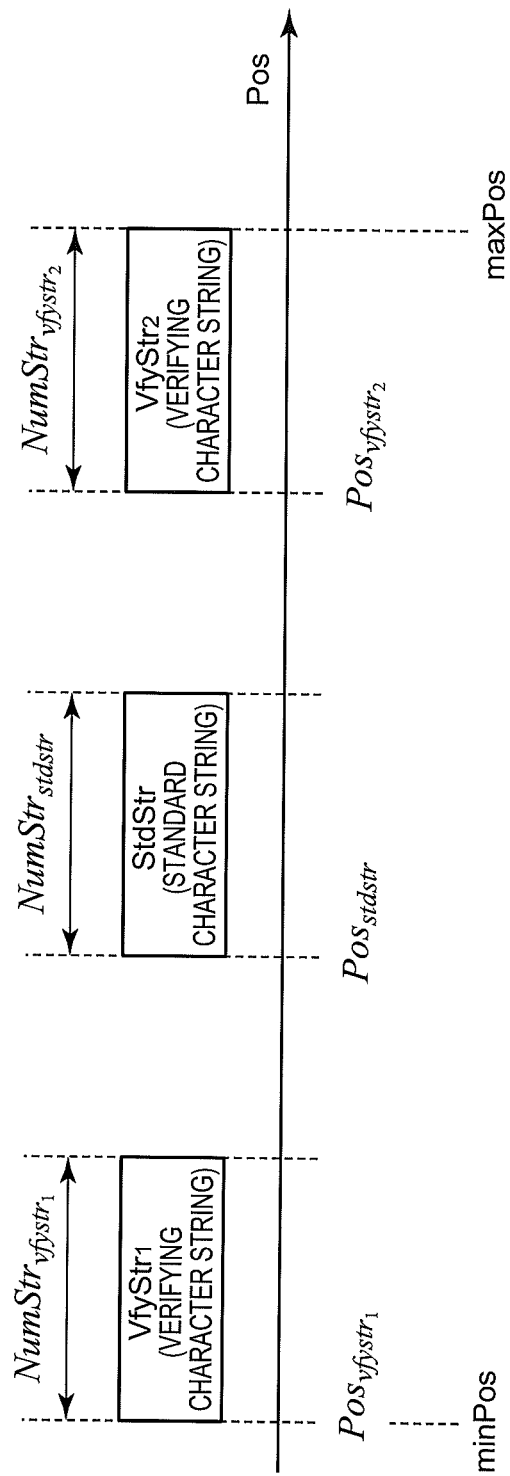
FIG. 18 is a diagram showing an example of upper and lower limits of a minimum inclusion area of a search keyword.

The following describes an upper limit maxPos and a lower limit minPos calculated by Expression (5) and a distance between search keywords (without consideration of the input order) calculated using these values, with reference to a specific example of the standard character string "while", the first verifying character string "for", and the second verifying character string "a". As shown in FIG. 18, the upper limit maxPos and the lower limit minPos are, respectively, the upper limit and the lower limit of the minimum area (hereinafter referred to as "minimum inclusion area") that includes all of the standard character string "while", the first verifying character string "for" with the shortest distance from the standard character string "while", and the second verifying character string "a" with the shortest distance from the standard character string "while". The difference between search keywords (without consideration of the input order) is a difference between the lower limit minPos and the upper limit maxPos.

The evaluation value calculated by Expression (5) therefore takes the minimum value when the character string included in the minimum inclusion area consists only of the input search keywords. The calculated evaluation value becomes lower, as the minimum inclusion area including all the search keywords becomes narrower (i.e., as the beginning of the earliest one of the search keywords is closer to the end of the last one of the search keywords). For example, when the input plural search keywords are "for", "a", and "while", an example text containing "for a while" has a lower evaluation value than that of an example text containing "for a brief while". Also, an example text containing "for a brief while" has a lower evaluation value than that of the text "This will allow you to look 'for a job while' you are working at a part-time job" that contains "for a job while". This is due to the fact that a user usually desires display of an example text providing a usage example of a phrase consisting only of the search keywords, and prefers display of an example text containing fewer characters other than the search keywords as opposed to display of an example text containing more characters other than the search keywords, and an example text in which more characters exist among the input search keywords is more likely to provide a usage example of a phrase different from the phrase formed of the input search keywords.

When the specified category for the specified text is a commentary section CC, the calculator 150 acquires, from the determining method table, information indicating the order determining method "Expression (6)", which is associated with information indicating that the number of search keywords is "plural" and information indicating the specified category "commentary section".

Then, the calculator 150 calculates a difference between the search keywords and calculates a lower limit minPos in the same manner as the calculation of an evaluation value using Expression (5). The calculator 150 further calculates the start position of the commentary section CC corresponding to the specified entry section in the same manner as the calculation of an evaluation value using Expression (3). The calculator 150 thereafter calculates an evaluation value for the specified text by applying the distance between the search keywords, the lower limit minPos, and the start position Pos$_{idxid,comentary}$ of the commentary section CC to Expression (6) below:

$$Est_{idxid,cgy} = Est_{idxid,1} \quad (6)$$
$$= EstDist_{WithoutOrder} + (\min Pos - Pos_{idxid,comentary})$$

With respect to commentary texts having the same distance between search keywords (without consideration of the input order), the evaluation value calculated by Expression (6) becomes lower, as the lower limit minPos of the minimum inclusion area including the search keywords is closer to the start position of the commentary section CC. With respect to commentary texts having the same distance between the lower limit minPos and the start position of the commentary section CC, the evaluation value calculated by Expression (6) becomes lower, as the distance between search keywords (without consideration of the input order) becomes shorter.

When the specified category for the specified text is an example section CX, the calculator 150 acquires, from the determining method table, information indicating the order determining method "Expression (7)", which is associated with information indicating that the number of search keywords is "plural" and information indicating the specified category "example section".

In this case, the calculator 150 calculates a difference between the search keywords and calculates a lower limit minPos in the same manner as the calculation of an evaluation value using Expression (5). The calculator 150 further calculates the start position of the example text in the same manner as the calculation of an evaluation value using Expression (6). The calculator 150 thereafter calculates an evaluation value for the specified text by applying the distance between the search keywords, the lower limit minPos, and the start position Pos$_{idxid,example,expid}$ of the example text to Expression (7) below:

$$Est_{idxid,cgy} = Est_{idxid,2} \quad (7)$$
$$= EstDist_{WithoutOrder} + (\min Pos - Pos_{idxid,exaple,expid})$$

With respect to example texts containing the same search keywords in the same order with the same distance therebetween (without consideration of the input order), the evaluation value calculated by Expression (7) becomes lower, as the lower limit minPos is closer to the start position of the example text. With respect to example texts having the same distance between the lower limit minPos and the start position of the example texts, the evaluation value calculated by Expression (7) becomes lower, as the distance between the search keywords (without consideration of the input order) becomes shorter.

After calculating the evaluation value for the specified text containing the notable appearance position as above, the main searcher 1420 determines whether the above-described process has been executed for all the appearance positions of the standard character string acquired at the step S52 as a notable appearance position (step S61). When determining that any appearance position remains unprocessed (step S61; No), the main searcher 1420 repeats the process from the step S56 for the subsequent unprocessed appearance position.

When determining that the above-described process has been executed for all the appearance positions (step S61; Yes), the determiner 160 determines, based on the evaluation values calculated at the step S60, the display order of one or more specified texts in each category (step S62). In the present embodiment, the determiner 160 determines the display order so that a specified text with a lower evaluation value is displayed at an earlier position.

The outputter 170 outputs to the display 180 a signal indicating a search-result display screen, which displays one or more specified texts in the determined display order for each category (step S63). Then, the plural-character-string search process is terminated. The display 180 displays a search-result display screen based on the output signal.

As described above, the text search apparatus according to the present embodiment enables execution of a forward matching search and another search (partial match search) using a single set of indexes (transposed indexes). The text search apparatus therefore requires only a small storage capacity to achieve text search functions with great convenience for users, which are able to present results of a forward matching search and a partial match search to the users.

Also, the text search apparatus according to the present embodiment adopts an evaluation value calculated by Expression (1) and a search using beginning marks, and thus achieves means (specification means) for specifying a character string at the beginning of which a search keyword is located in a text to be subject to forward matching search using index information intended for partial match search. Hence, achievement of the text search functions with great convenience does not require much increase in the calculation amount.

For example, the text search apparatus according to the present embodiment specifies a character string at the beginning of which a search keyword is located through a search using beginning marks, to thereby suppress the number of search hit candidates and need a smaller calculation amount in comparison to the case of a search without beginning marks.

In addition, the text search apparatus according to the present embodiment executes a forward matching search (incremental search) while a user is inputting a search keyword one character by one character, and executes a partial match search, which provides a greater number of and more detailed search results, when the search keyword has been finalized. The text search apparatus thus can present search results required by a user depending on the situation such as during input of a keyword or after finalization of a keyword.

Modified Example

Although Embodiment 1 of the present invention is described above, an embodiment of the present invention is not limited thereto.

For example, although the above-described Embodiment 1 uses a space as the beginning mark, a beginning mark is not limited thereto and can be arbitrarily selected. For example, a beginning mark may be a unique mark registered in the system (a mark that does not appear in any other texts to be subject to forward matching search). In this case, if a search for a search keyword incorporating a unique beginning mark is executed using transposed indexes incorporating the beginning marks, a search hit portion is always located at the beginning of a subject character string. This configuration therefore does not require evaluation whether the search hit portion is located at the beginning of a text subject to forward matching search based on comparison between the address designating the start position and the search hit portion. Specifically, this configuration does not require calculating an evaluation value at the step S312 in FIG. 11 or reflecting the calculation result in the determination process at the step S313. This configuration can therefore achieve both forward matching search and partial match search with a small necessary calculation amount.

Moreover, when the address designating the start position and a search hit portion are compared and evaluated in a forward matching search, even if the transposed indexes do not incorporate beginning marks and the beginning mark is not added in front of a search keyword, the text search apparatus is able to execute a forward matching search using the transposed indexes. In this case, even if transposed indexes are stored in an external server and are general transposed indexes without beginning marks, the text search apparatus is able to execute both forward matching search and partial match search using the transposed indexes.

Although the text search apparatus 100 executes a process of generating rearranged CTD and transposed indexes (data generating process) in Embodiment 1, an embodiment is not limited thereto and may be modified so that the text search apparatus 100 may store, in a storage, rearranged CTD and transposed indexes generated by an external device in advance. For example, the text search apparatus 100 may store rearranged CTD and transposed indexes corresponding to each dictionary data as a factory setting.

In Embodiment 1 and a modified example thereof, electronic dictionaries include electronic encyclopedias. That is, an electronic dictionary may be a Japanese dictionary, an English-Japanese dictionary, a Japanese-English dictionary, or an encyclopedia. Although the text search apparatus 100 in the above-described Embodiment 1 searches dictionaries based on a search keyword, documents to be searched are not limited to dictionaries and may be any documents formed of texts classified into plural categories. Regarding the incremental search (forward matching search) and the full text search (partial match search), a specific method, in particular, an order determining method can be arbitrarily set.

A document to be searched may be, for example, a patent specification formed of texts, which are classified into the categories such as "Title of the Invention" and "Claims". In this case, the titles of the invention may be subject to incremental search, and the entire text may be subject to main search.

A document to be searched may be, for example, an instruction manual having a category into which texts representing the names of the functions of a certain product are classified (hereinafter referred to as "function name category") and a category into which texts describing operation methods for using the functions are classified (hereinafter referred to as "operation method category"). In this case, the product name and the categories may be subject to incremental search, and the entire text may be subject to main search.

Although the above-described Embodiment 1 uses a N-gram search as a search method for a search keyword, but a search method is not limited thereto.

The present invention can not only provide the text search apparatus 100 according to Embodiment 1 or a modified example thereof, but also cause an existing text search apparatus to function as the text search apparatus 100 by application of a program. Specifically, a text search program for achieving the functions of the text search apparatus 100 can be applied to a computer (e.g., CPU) that controls an existing text search apparatus in an executable manner, so that the existing text search apparatus can function as the text search apparatus 100 according to Embodiment 1 or a modified example thereof.

A method of distributing the program is arbitrarily selected. For example, the program may be distributed in the state of being stored in a recording medium such as a memory card, a CD-ROM, or a DVD-ROM, or may also be distributed via a communication medium such as the Internet. Additionally, an embodiment may be modified so that part or all of the data required for the above-described process such as rearranged CTD and transposed indexes may be stored in an external server, and so that the text search apparatus 100 may acquire the data through a communication function to execute the above-described process.

The present invention can be variously embodied and modified without departing from the spirit and scope of the present invention in a broad sense. Specifically, although one embodiment of the present invention has been described, the foregoing embodiment is intended to explain the present invention and does not limit the scope of the present invention. The scope of the present invention is not limited to the embodiment but encompasses the invention according to the claims and equivalents of the invention.

What is claimed is:

1. A text search apparatus comprising:
    a memory comprising:
        a document storage for storing document data that includes multiple categories of character string data, the multiple categories of character string data including at least one forward-matching-search target category that is a target of a forward matching search; and
        an index information storage for storing N-gram index information that includes the multiple categories of character string data, wherein a beginning mark is added before a beginning character of character string data contained in the at least one forward-matching-search target category, and no beginning mark is added before a beginning character of character string data contained in any remaining category of the multiple categories, the beginning mark indicating the beginning of the character string data; and
    a processor that is operable to function as:
        an acquirer which acquires a search keyword;
        an incremental searcher which adds the beginning mark before a beginning character of the acquired search keyword, generates N-gram data based on the search keyword having the beginning mark added, and performs, based on the N-gram index information, the forward matching search on the character string data contained in the at least one forward-matching-search target category;
        a main searcher which generates N-gram data based on the acquired search keyword without adding the beginning mark before a beginning character of the acquired search keyword, and performs, based on the N-gram index information, a partial matching search on character string data contained in the multiple categories; and
        an outputter which outputs a result of the forward matching search and a result of the partial matching search;
    wherein the document data is dictionary data that includes an entry-word data category and a commentary data category, and the at least one forward-matching-search target category contains the entry-word data category.

2. The text search apparatus according to claim 1, wherein the processor receives, when acquiring the search keyword, an operation by a user for inputting the search keyword one character by one character, and executes the forward matching search each time the user inputs one character.

3. The text search apparatus according to claim 2, wherein the processor receives, when acquiring the search keyword, an operation by the user for finalizing the search keyword, and the processor executes the forward matching search until the search keyword is finalized and executes the partial matching search based on the finalized search keyword after the search keyword is finalized.

4. The text search apparatus according to claim 1, wherein when outputting the search results, the processor determines an output order for outputting character string data retrieved by the search using an output-order calculating method, and outputs the search results in accordance with the determined output order.

5. A text search method of a text search apparatus, the text search apparatus comprising a processor, and a memory which includes (i) a document storage for storing document data that includes multiple categories of character string data, the multiple categories including at least one forward-matching-search target category that is a target of a forward matching search, and (ii) an index information storage for storing N-gram index information that includes the multiple categories of character string data, wherein a beginning mark is added before a beginning character of character string data contained in the at least one forward-matching-search target category, and no beginning mark is added before a beginning character of character string data contained in any remaining category of the multiple categories, the beginning mark indicating the beginning of the character string data, and wherein the text search method is implemented by the processor and comprises:
    acquiring a search keyword;
    adding the beginning mark before a beginning character of the acquired search keyword, generating N-gram data based on the search keyword having the beginning mark added, and performing, based on the N-gram index information, the forward matching search on the character string data contained in the at least one forward-matching-search target category;
    generating N-gram data based on the acquired search keyword without adding the beginning mark before a beginning character of the acquired search keyword, and performing, based on the N-gram index information, a partial matching search on character string data contained in the multiple categories; and outputting a result of the forward matching search and a result of the partial matching search;

wherein the document data is dictionary data that includes an entry-word data category and a commentary data category, and the at least one forward-matching-search target category contains the entry word category.

6. The text search method according to claim 5, wherein in the acquiring the search keyword, an operation by a user is received for inputting the search keyword one character by one character, and the forward matching search is executed each time the user inputs one character.

7. The text search method according to claim 6, wherein in the acquiring the search keyword, an operation by the user is received for finalizing the search keyword, and the forward matching search is executed until the search keyword is finalized, and the partial matching search is executed based on the finalized search keyword after the search keyword is finalized.

8. The text search method according to claim 5, wherein in the outputting the search results, an output order for outputting character string data retrieved by the search is determined using an output-order calculating method, and the search results are output in accordance with the determined output order.

\* \* \* \* \*